(12) United States Patent
Johnson et al.

(10) Patent No.: US 11,180,308 B2
(45) Date of Patent: Nov. 23, 2021

(54) PAINT DISPENSING METHOD AND APPARATUS

(71) Applicant: SWIMC, LLC, Cleveland, OH (US)

(72) Inventors: James J. Johnson, Lake Milton, OH (US); Richard D. Hudson, Warrensville Heights, OH (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 16/290,089

(22) Filed: Mar. 1, 2019

(65) Prior Publication Data

US 2019/0270576 A1    Sep. 5, 2019

Related U.S. Application Data

(60) Provisional application No. 62/636,955, filed on Mar. 1, 2018.

(51) Int. Cl.
*B65D 83/28* (2006.01)
*B05B 7/02* (2006.01)
(Continued)

(52) U.S. Cl.
CPC ............ *B65D 83/28* (2013.01); *B05B 7/02* (2013.01); *B65D 83/203* (2013.01);
(Continued)

(58) Field of Classification Search
CPC .......... B65B 3/28; B65B 3/203; B65B 3/207; B65B 3/382; B65B 3/40; B05B 7/02; Y02W 30/80
(Continued)

(56) References Cited

U.S. PATENT DOCUMENTS

| 1,800,156 A | * | 4/1931 | Rotheim | B05D 1/02 |
| | | | | 427/421.1 |
| 2,887,272 A | * | 5/1959 | Rosenthal | B05B 7/1209 |
| | | | | 239/310 |

(Continued)

FOREIGN PATENT DOCUMENTS

| BE | 531160 A | 8/1954 |
| CA | 2981486 | * 10/2016 |

(Continued)

OTHER PUBLICATIONS

Patent Cooperation Treaty (PCT), International Search Report and Written Opinion issued in PCT International Application No. PCT/US2019/020284, having an International Filing Date of Mar. 1, 2019, dated Jun. 4, 2019 (16 pgs).

(Continued)

*Primary Examiner* — Lien M Ngo
(74) *Attorney, Agent, or Firm* — Wentsler LLC

(57) ABSTRACT

A paint container for use with a reusable dispensing apparatus, and the reusable dispensing apparatus are provided to dispense paint under pressure. The paint container includes a housing defining an interior space that is devoid of an internal valve, and a combination comprising a propellant combined with paint within the interior space. A container cap is installed on the housing to enclose the propellant combined with the paint within the interior space at an elevated pressure, and defines a channel that cooperates with a portion of the housing. A compressible gasket is disposed within the channel and compressed between the container cap and the portion of the housing to form a seal that interferes with an escape of the propellant combined with the paint between the container cap and the housing. A releasable fastener engages releasably couples the reusable dispensing apparatus to the container cap.

10 Claims, 29 Drawing Sheets

(51) Int. Cl.
    *B65D 83/20*         (2006.01)
    *B65D 83/38*         (2006.01)
    *B65D 83/40*         (2006.01)

(52) U.S. Cl.
    CPC ......... *B65D 83/207* (2013.01); *B65D 83/382* (2013.01); *B65D 83/40* (2013.01)

(58) Field of Classification Search
    USPC ......... 222/81, 83, 402.15, 402.13, 174, 136, 222/402.1, 82, 635
    See application file for complete search history.

(56) References Cited

U.S. PATENT DOCUMENTS

| | | | | |
|---|---|---|---|---|
| 3,209,949 | A * | 10/1965 | Gurtler | A62C 37/50 222/49 |
| 3,270,919 | A | 9/1966 | Frangos et al. | |
| 3,448,779 | A * | 6/1969 | Horwitt | B60S 5/043 141/38 |
| 3,880,187 | A | 4/1975 | Kneusel | |
| 4,121,772 | A | 10/1978 | Cronan | |
| 4,971,224 | A * | 11/1990 | Scremin | F24C 3/14 222/3 |
| 5,038,964 | A | 8/1991 | Bouix | |
| 5,052,585 | A | 10/1991 | Bolduc | |
| 5,199,615 | A * | 4/1993 | Downing | B65D 83/38 222/397 |
| 5,226,573 | A * | 7/1993 | Brugerolle | B65D 83/38 222/402.1 |
| 6,068,202 | A | 5/2000 | Hynes | |
| 6,341,711 | B1 * | 1/2002 | Blake | B65D 83/38 220/614 |
| 6,343,722 | B1 * | 2/2002 | Di Giovanni | B65D 83/38 222/394 |
| 6,378,789 | B1 | 4/2002 | Seaman, Jr. | |
| 6,431,412 | B1 * | 8/2002 | Abplanalp | B21D 51/38 222/402.1 |
| 6,817,553 | B2 | 11/2004 | Steur | |
| 9,656,310 | B2 | 5/2017 | Johnson | |
| 10,124,356 | B2 | 11/2018 | Johnson | |
| 10,640,284 | B2 * | 5/2020 | Franckhauser | B65D 83/44 |
| 2007/0267518 | A1 | 11/2007 | Darling | |
| 2008/0169047 | A1 | 7/2008 | Connolly et al. | |
| 2011/0180626 | A1 | 7/2011 | Kang | |
| 2015/0136122 | A1 * | 5/2015 | Stuart | A61M 15/009 128/200.23 |
| 2017/0028417 | A1 | 2/2017 | Johnson | |

FOREIGN PATENT DOCUMENTS

| | | |
|---|---|---|
| JP | 3672379 B2 | 7/2005 |
| JP | 5576871 B2 | 8/2014 |
| WO | 2006018593 | 2/2006 |
| WO | 2015153669 | 10/2015 |

OTHER PUBLICATIONS

International Search Report and Written Opinion, European Patent Office, dated Jun. 17, 2015, PCT/US2015/023682.

\* cited by examiner

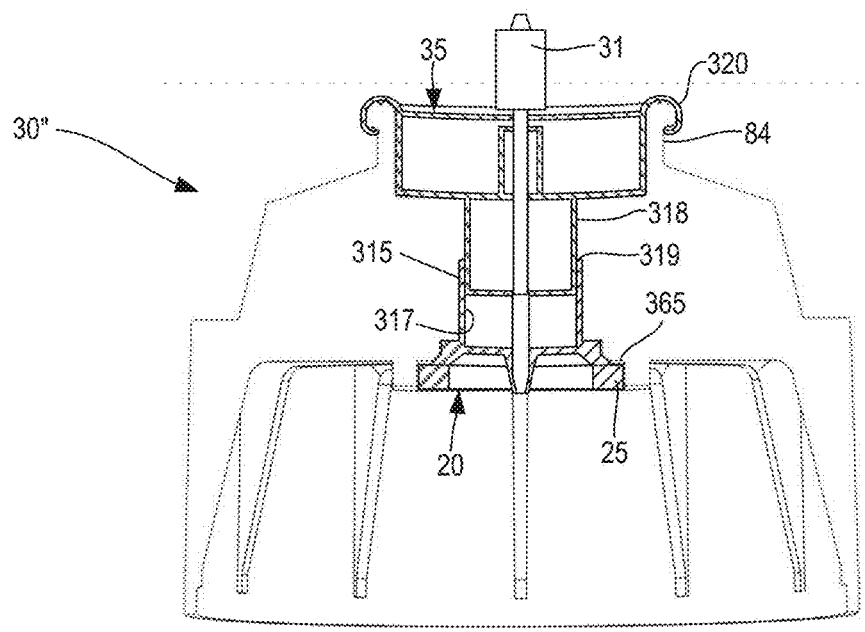
FIG. 31
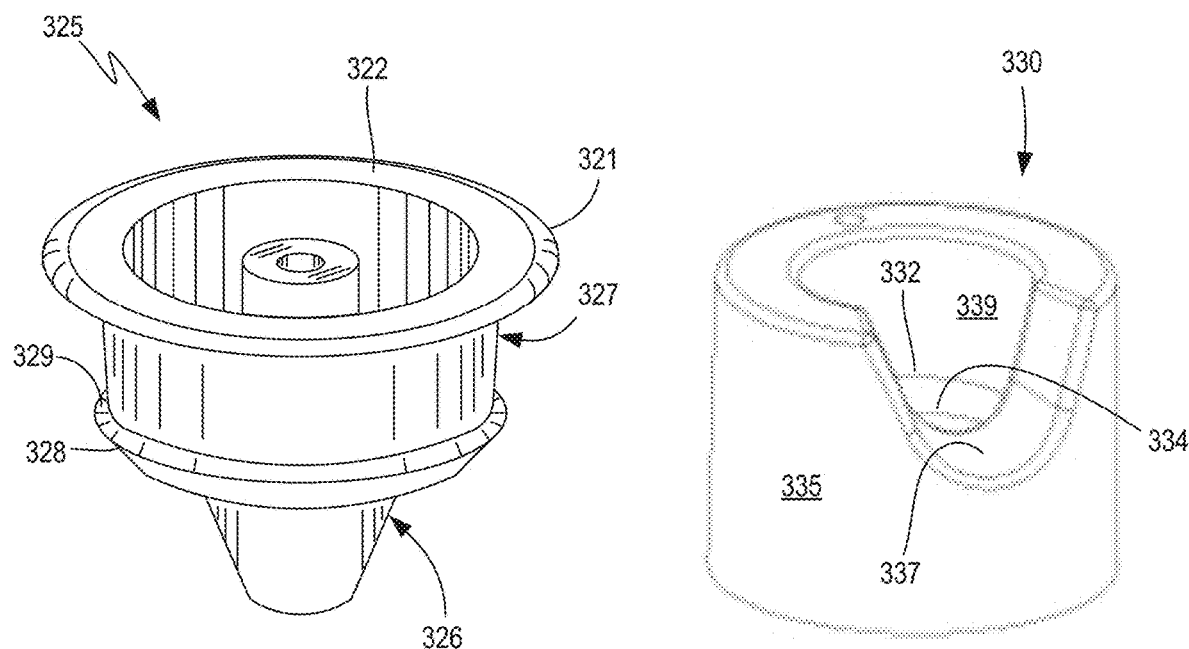
FIG. 32
FIG. 33

PAINT DISPENSING METHOD AND APPARATUS

CROSS REFERENCE TO RELATED APPLICATIONS

This application claims the benefit of U.S. Provisional Patent Application No. 62/636,955, filed Mar. 1, 2018, which is incorporated in its entirety herein by reference.

BACKGROUND OF THE INVENTION

1. Field of Invention

This invention generally relates to methods and apparatuses for dispensing paint from pressurized paint containers and, more specifically, to a replaceable paint dispensing apparatus to be used on more than one paint container and methods of manufacturing and using a replaceable paint dispensing apparatus.

2. Description of Related Art

Traditionally, cans of spray paint are formed from a metallic canister defining an interior space with paint and a valve assembly sealed therein. A nozzle is exposed externally of the canister to be actuated by a user to discharge a mist of paint to apply a coating of paint onto a target surface. Since the valve assembly is sealed within the interior space defined by the canister, however, the valve is usable only with that one canister and is not removable. Also, any unused paint and propellant within the interior space require users to follow special disposal instructions, or require the user to manually discharge the unused contents through the nozzle by manually actuating the nozzle as is done during painting.

Such traditional cans of spray paint have also been manufactured by first sealing the valve within the canister and installing the nozzle on a valve stem that is exposed externally of the canister. Only then would the nozzle or valve stem be actuated to cause the valve to open the interior passage leading into the interior of the canister to allow the paint and propellant to be inserted into the canister through that open interior passage. Since the valve is already in place within the canister, once the canister is sufficiently filled the nozzle and/or valve stem could be released, thereby causing the valve to once again close the interior passage leading into the interior of the canister and trapping the paint and propellant therein. Filling the canister in this manner necessarily requires the valve to first be installed within the canister to close the interior passage and contain the contents once they have been inserted into the canister.

BRIEF SUMMARY OF THE INVENTION

Thus, there is a need in the art for a reusable paint dispensing apparatus including a valve assembly that can be removably installed on a plurality of paint canisters, and a method of preparing a paint canister that lacks a dedicated valve assembly installed as part of the paint canister.

According to some embodiments of this invention, a fluid dispensing apparatus may be used in dispensing a paint fluid from an associated paint container under a pressure greater than ambient. The associated paint container may contain associated paint and may have a pierceable membrane. The fluid dispensing apparatus may comprise: a valve body having a top, a bottom and a bore that extends through the valve body; an adaptor having a top, a bottom, a bore that extends through the adaptor and a piercing member; and, a nozzle attached to the top of the valve body and having a bore that is communicatable with the valve body bore. The bottom of the valve body may be attached to the top of the adaptor and the adaptor bore may communicate with the valve body bore. The fluid dispensing apparatus may be operable by attaching the bottom of the adaptor to the associated paint container to pierce the pierceable membrane with the piercing member to communicate the associated paint within the paint container with the adaptor bore and thus with the valve body bore. The nozzle may be operable to permit the associated paint within the associated paint container to flow under the pressure out of the associated paint container, through the adaptor bore, through the valve body bore and through the nozzle bore to ambient.

According to other embodiments of this invention, a method of dispensing a paint fluid from an associated paint container under a pressure greater than ambient may be provided. The associated paint container may contain associated paint and may have a pierceable membrane. The method may comprise the steps of: (A) providing a fluid dispensing apparatus comprising: (1) a valve body having a top, a bottom and a bore that extends through the valve body; (2) an adaptor having a top attached to the bottom of the valve body, a bottom, a bore that extends through the adaptor and a piercing member; wherein the adaptor bore communicates with the valve body bore; and, (3) a nozzle attached to the top of the valve body and having a bore that is communicatable with the valve body bore; (B) attaching the bottom of the adaptor to the associated paint container to pierce the pierceable membrane with the piercing member to communicate the associated paint within the paint container with the adaptor bore and thus with the valve body bore; and, (C) operating the nozzle to permit the associated paint within the associated paint container to flow under the pressure out of the associated paint container, through the adaptor bore, through the valve body bore and through the nozzle bore to ambient.

According to still other embodiments of this invention, a paint apparatus may comprise: (A) a paint container containing a paint fluid under a pressure greater than ambient and having a pierceable membrane; (B) a fluid dispensing apparatus comprising: (1) a valve body having a top, a bottom and a bore that extends through the valve body; (2) an adaptor having a top, a bottom, a bore that extends through the adaptor and a piercing member, wherein the bottom of the valve body is attached to the top of the adaptor and the adaptor bore communicates with the valve body bore; and, (3) a nozzle attached to the top of the valve body and having a bore that is communicatable with the valve body bore. The fluid dispensing apparatus may be operable by attaching the bottom of the adaptor to the paint container to pierce the pierceable membrane with the piercing member to communicate the paint within the paint container with the adaptor bore and thus with the valve body bore. The nozzle may be operable to permit the paint within the paint container to flow under the pressure out of the paint container, through the adaptor bore, through the valve body bore and through the nozzle bore to ambient.

According to other embodiments, a paint container for use with a reusable dispensing apparatus may comprise: a housing defining an interior space that is devoid of an internal valve; a combination comprising a propellant combined with paint within the interior space; a container cap installed on the housing to enclose the propellant combined with the paint within the interior space at an elevated pressure relative to an ambient pressure of the paint container, wherein the container cap comprises a pierceable membrane and defines a channel that cooperates with a portion of the housing; a compressible gasket that is disposed within the channel and compressed between the container cap and the portion of the housing to form a seal that interferes with an escape of the propellant combined with the paint from the interior space at an interface between the container cap and the housing; and a releasable fastener that engages a portion of the reusable dispensing apparatus to releasably couple the reusable dispensing apparatus to the container cap and establish a seal between the container cap and the reusable dispensing apparatus that interferes with an escape of the propellant combined with the paint between the container cap and the reusable dispensing apparatus after the pierceable membrane has been pierced.

According to other embodiments, a reusable fluid dispensing apparatus for controlling an expulsion of paint from a paint container is provided. The paint container stores the paint to be discharged in an interior space that lacks an internal valve to control discharges of the paint. The paint container also includes a pierceable membrane and a coupling element that cooperates with the reusable fluid dispensing apparatus to releasably couple the reusable fluid dispensing apparatus to the paint container. The fluid dispensing apparatus comprises: a valve body comprising: (i) a releasable fastener that engages a compatible connector provided to the paint container to couple the fluid dispensing apparatus to the paint container and cause the piercing member to puncture the pierceable membrane, and (ii) a support member that protrudes from the valve body and cooperates with a portion of a protective cap to be installed on the reusable fluid dispensing apparatus. The fluid dispensing apparatus also comprises a valve coupled to the valve body to be supported externally of the paint container while the reusable fluid dispensing device is installed on the paint container to control the expulsion of the paint from the paint container; a nozzle in fluid communication with the valve, the nozzle being manually adjustable to open the valve and direct paint expelled from the paint container that passes through the valve toward a target surface; and a piercing member that defines an interior passage and is positioned to puncture a membrane enclosing the paint container to establish fluid communication between the paint container and the valve.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

In the accompanying drawings, structures are illustrated that, together with the detailed description provided below, describe exemplary embodiments of the claimed invention. The invention may take physical form in certain parts and arrangement of parts, embodiments of which will be described in detail in this specification and illustrated in the accompanying drawings which form a part hereof and wherein:

FIG. 31 is a sectional view of the valve body in FIG. 30, taken along line 31-31, with a valve cap and an adaptor installed and shown partially cutaway;

FIG. 32 is a one-piece adaptor insert that includes a valve cap and an adaptor integrally formed together as a monolithic structure;

FIG. 33 is a perspective view of a protective cap that is to be installed on embodiments of a valve body;

DETAILED DESCRIPTION OF THE INVENTION

Figure 1:
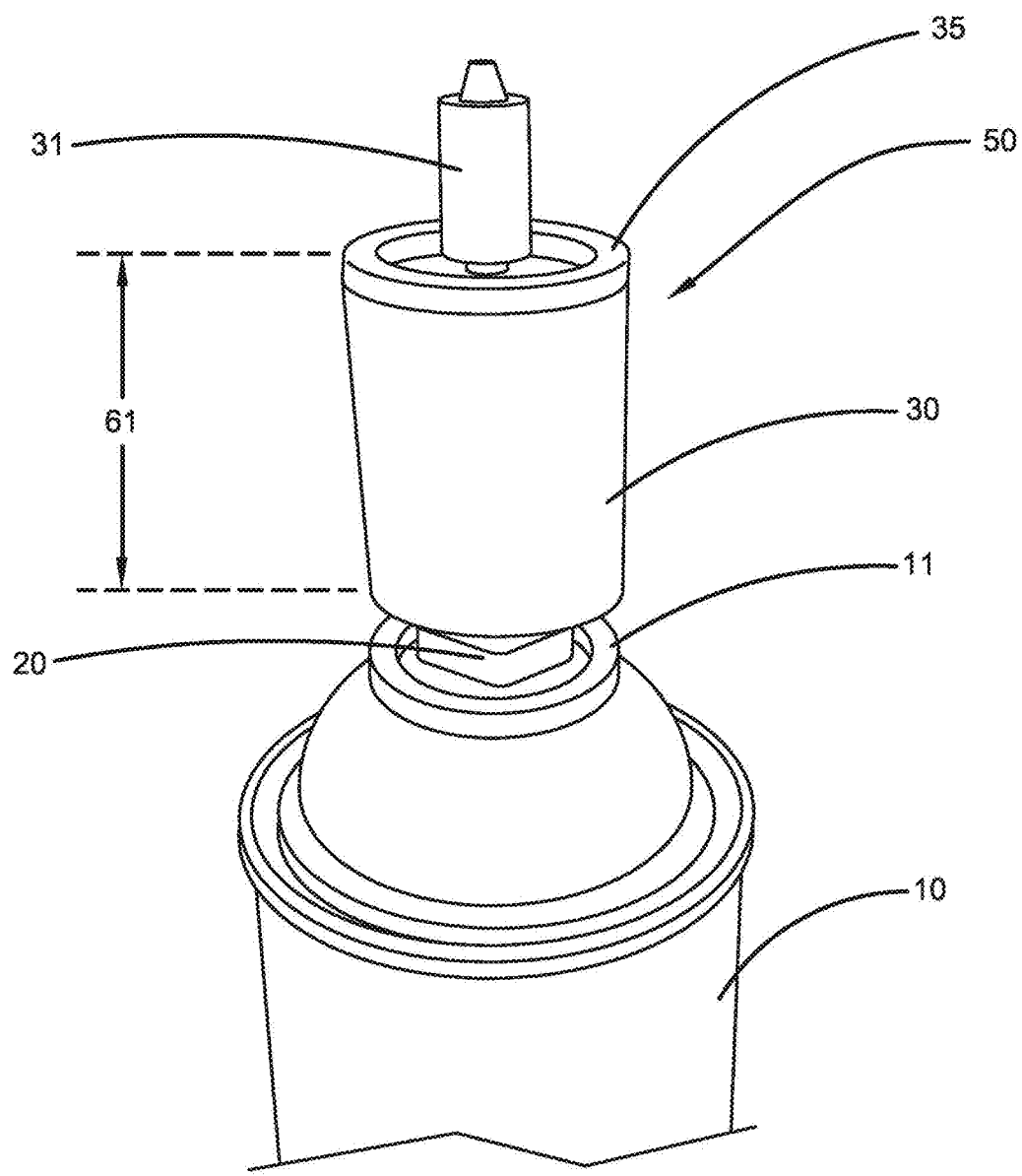
FIG. 1 is a perspective view of a fluid dispensing apparatus in accordance with some embodiments of this invention.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

Referring now to the drawings wherein the showings are for purposes of illustrating embodiments of the invention only and not for purposes of limiting the same, and wherein like reference numerals are understood to refer to like components, FIG. 1 shows a perspective view of a pressurized paint container 10 equipped with a fluid dispensing apparatus 50 equipped with an external valve body 30 according to some embodiments of this invention. The pressurized paint container 10 shown is a can made from one or more metals and/or metal alloys that is devoid of an internal valve within an interior space defined by the paint container 10 containing the paint. In other words, the external valve body 30 is screwed onto a threaded section 59 of an adaptor 20 as described below, or otherwise installed, to control and regulate the expulsion of the paint under the pressure generated within the interior space of the paint container 10 by the propellant, instead of valve within the interior space of the paint container 10 itself. Puncturing the membrane 15 as described below without the external valve body 30 would result in the uncontrolled release and depletion of the propellant from the paint container 10 to the ambient environment. However, the fluid dispensing apparatus 50 described herein will work with any type, size and shape of pressurized paint container with 10. The paint dispensed by the fluid dispensing apparatus 50 may be a pressurized paint fluid that is a liquid, gas, vapor, or a mixture thereof. While the fluid dispensing apparatus 50 is designed to dispense paint, it may have application to other fluids as well.

With continuing reference to FIG. 1, the fluid dispensing apparatus 50 may, in some embodiments, include a nozzle 31, a valve body 30, and an adaptor 20. The nozzle 31 may be like nozzle 202 discussed above. Because the operation of such nozzles 31, 202—laterally displaceable to permit the contents to exit the nozzle and biased into a non-displaced position where the contents cannot exit the nozzle—are well known to people of skill in the art, no details will be provided here.

Figure 3:
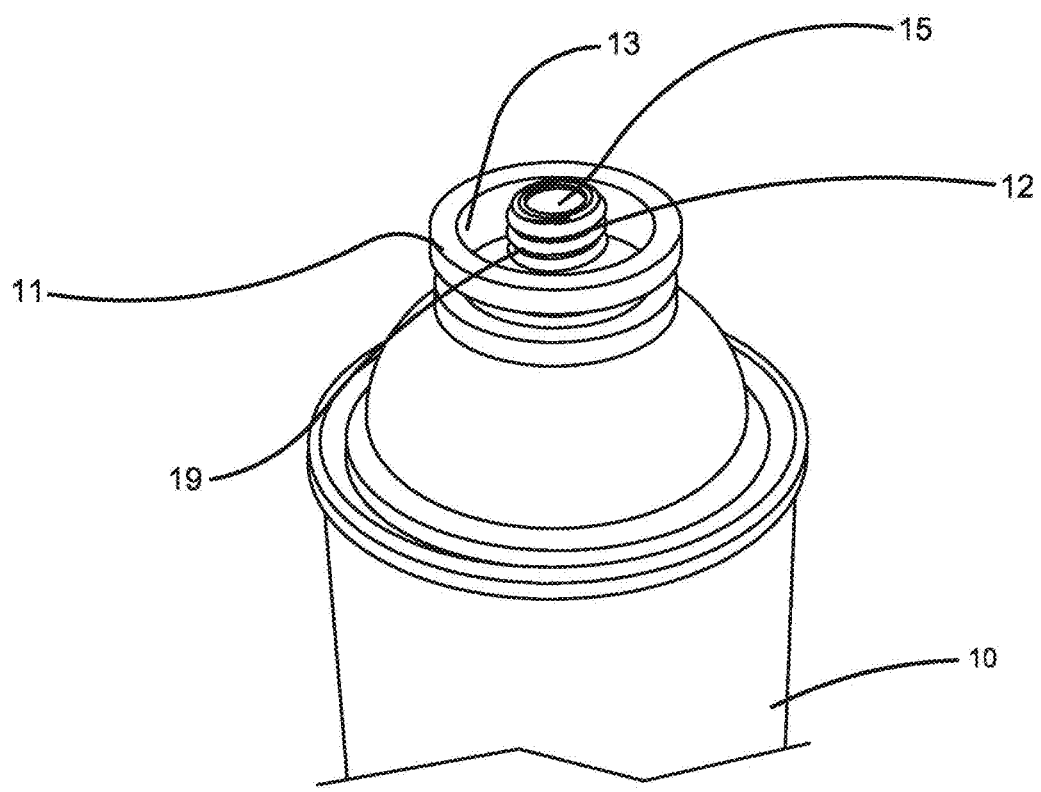
FIG. 3 is a perspective view of a paint container in accordance with some embodiments of this invention.
Figure 6:
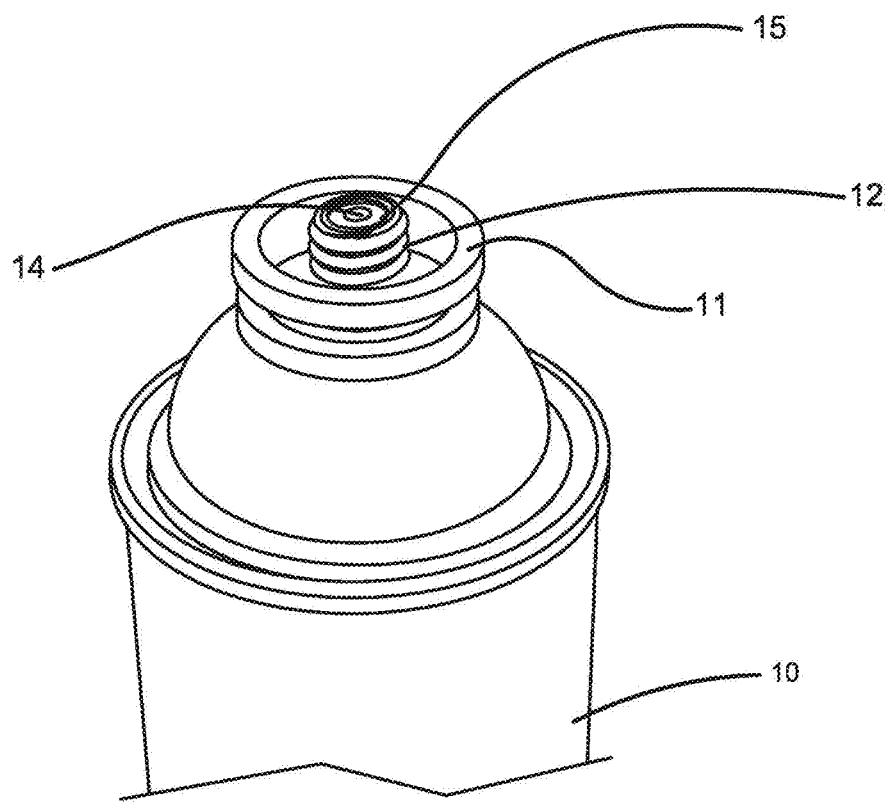
FIG. 6 shows a container in accordance with some embodiments of this invention with a pierceable membrane pierced.

With reference now to FIGS. 3 and 6, in order to use the fluid dispensing apparatus, it may be necessary to attach a container cap 11 to the pressurized container 10. The container cap 11 may, in one embodiment, be fixedly joined to the top of the pressurized container 10 such as being crimped in a known manner. The container cap 11 may be, in one embodiment, positioned substantially concentrically with the container's longitudinal axis. The container cap 11 may have a well 13, a coupling element 12, and a fluid passage bore 14 (visible in FIG. 6). A membrane 15 may cover the bore 14. Membrane 15 may be pierceable and located with respect to fluid passage bore 14 in such a manner as to seal bore 14 and prevent fluid from exiting container 10 until it is pierced. The embodiment of the membrane 15 shown in FIG. 3 includes a planar metal surface integrally formed as part of a monolithic structure along with the other portions of the container cap 11, such as the coupling element 12, well 13 and threaded section 19 described below, for example. Such structures can be integrally formed together by stamping a flat sheet of suitable metal stock into the desired shape of the container cap 11. FIG. 6 shows membrane 15 in a pierced or punctured condition which exposes fluid passage bore 14 to outside of the pressurized container 10, and establishes fluid communication with the fluid dispensing apparatus 50. In the illustrated embodiments, the membrane 15 is fixedly connected to the coupling element 12 to close an uppermost region of that coupling element 12. The coupling element 12 in FIGS. 3 and 6 is generally cylindrical, protruding upward from a base of the container cap 11 at the bottom of the well 13, but may be of any desired size, shape and relative position to the other portions of the container cap 11 to releasably couple the fluid dispensing apparatus 50 to the container cap 11. To be releasably coupled, the fluid dispensing apparatus 50 can be installed on, and subsequently removed from a plurality of paint containers 10 without being damaged to an extent that would prevent reuse of the fluid dispensing apparatus 50. In one embodiment coupling element 12 may have an externally threaded (mail threading) section 19, as shown. For the embodiment shown, the coupling element 12 is cylindrical in shape and the threaded section 19 is on the exterior surface of the coupling element 12. The threading extends along a suitable length of the cylindrical coupling element 12 to urge the fluid dispensing apparatus 50 toward the paint container 10 a suitable distance to both: (i) compress an elastomeric gasket 23, interchangeably referred to herein as a seal 23 described below with reference to FIG. 4B, provided to the fluid dispensing apparatus 50 against a surface of the container cap 11, and (ii) form the seal that interferes with the escape of the propellant from the interior space of the paint container 10 between the container cap 11 and the fluid dispensing apparatus 50. Materials used to form container cap 11 can include any metal or metal alloy having dimensions that permit stamping a planar sheet of the metal or metal alloy into the desired shape of the container cap 11, although other materials are also considered to be within the scope of the present disclosure.

Figure 19:
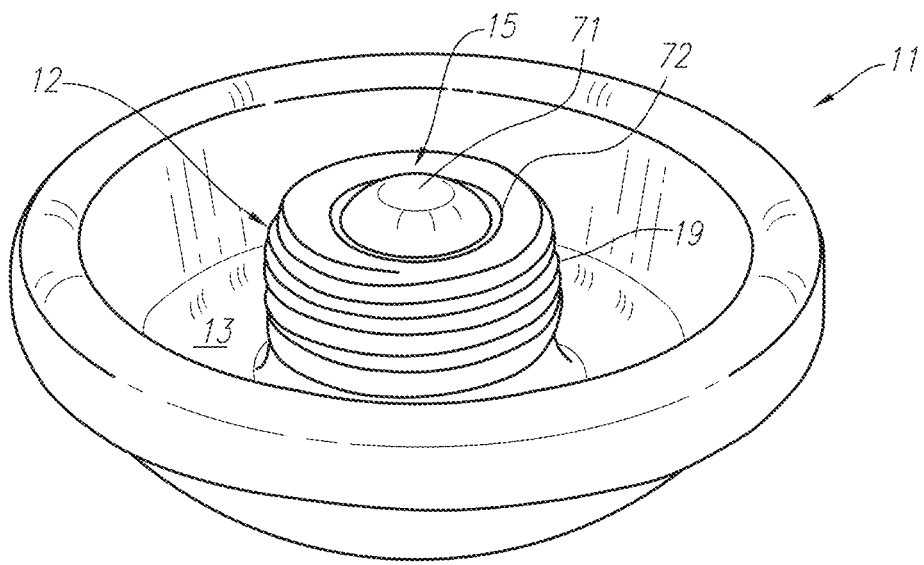
FIG. 19 is a top perspective view of an embodiment of a container cap.
Figure 20:
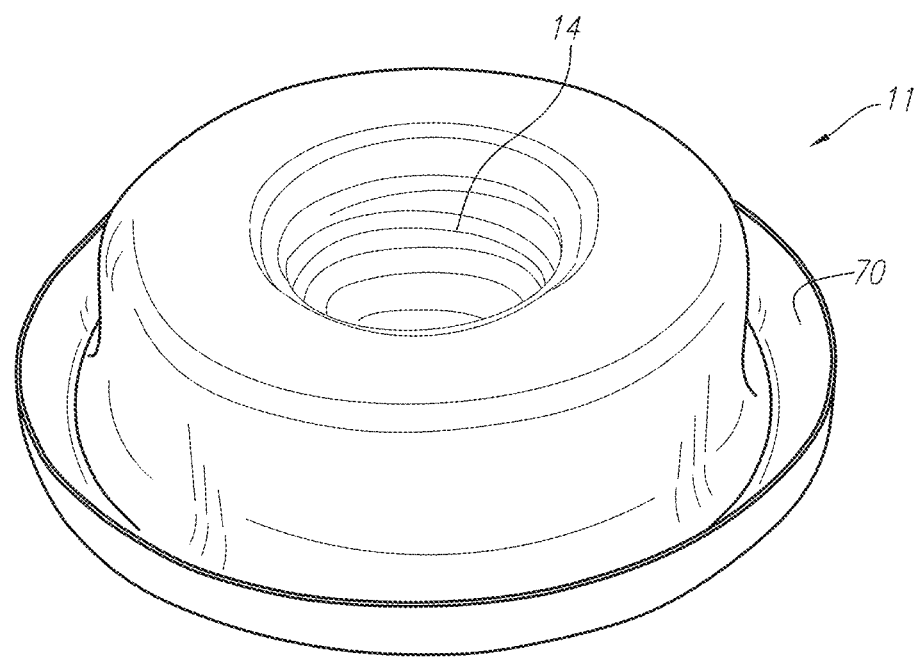
FIG. 20 is a bottom perspective view of the embodiment of the container cap shown in FIG. 19.

An alternate embodiment of the container cap 11 is shown in FIGS. 19 and 20. Like the previous embodiment, the present embodiment of the container cap 11 includes a cylindrical coupling element 12 with a threaded section 19 and a well 13 disposed between the coupling element 12 and a collar defining a downward-opening, annular channel 70 (FIG. 20) that extends about an external periphery of the container cap 11. However, the membrane 15 of the embodiment shown in FIG. 19 includes an elevated region 71 or plateau that protrudes upward from a neighboring or surrounding region 72 of the membrane 15. The coupling element 12 of any of the embodiments can also include a sealing surface 74 against which the gasket 23, described below, can be compressed against to interfere with the leakage of propellant between the fluid delivery apparatus 50 and the coupling element 12 of the container cap 11.

Figure 24:
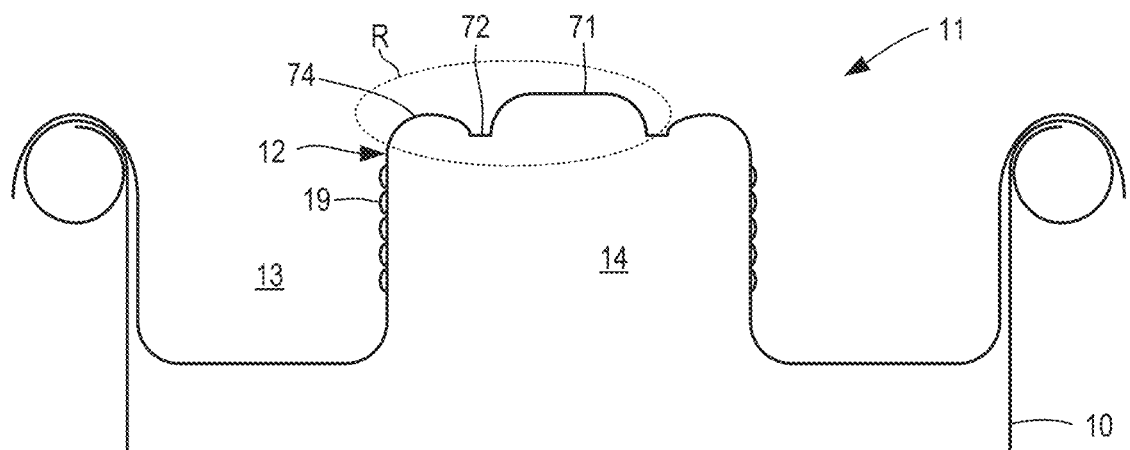
FIG. 24 is a cutaway view of the embodiment of the container cap shown in FIG. 23, with the rim of a paint container deformed to establish a friction fit between the paint container and the container cap to seal the paint and propellant within the paint container.
Figure 25:
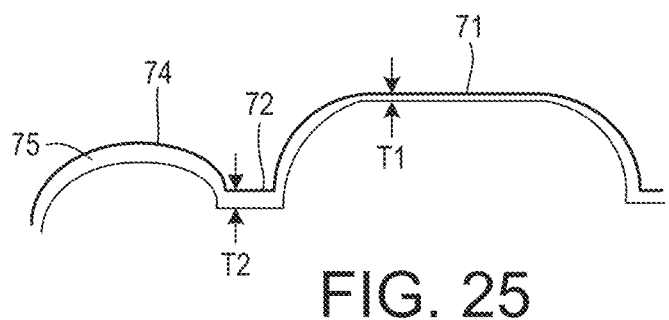
FIG. 25 is an enlarged view of a portion of the container cap within the enclosed region R shown in FIG. 24, illustrating a laminate coating applied to underside surfaces of the container cap.

The underside surfaces of the container cap 11 shown in FIG. 20 can optionally be provided with a laminate coating 75, which is schematically depicted in FIG. 25 as applied to a region R of the underside of the container cap 11 highlighted in FIG. 24. The laminate coating can be any suitable polymeric material that exhibits an elastic property applied as a liquid, gel or other spreadable state to one side of a flat sheet of metal stock from which the container cap 11 is to be stamped. Once the material is dried and the container cap 11 stamped, substantially all of the underside surfaces of the container cap 11 are provided with the laminate coating. Forming the elevated region 71, however, can optionally include applying a greater stamping force and/or pressure to the underside of the membrane 15 corresponding to that region 71 than the surrounding or neighboring region 72, for example. The resulting laminate coating 75 applied to the underside of the elevated region 71 can optionally have a thickness T1 (FIG. 25) that is less than a thickness T2 of the laminate coating 75 provided to another portion of the underside of the container cap 11. According to alternate embodiments, a cutting step can optionally be performed to at least partially remove, or at least score the laminate coating 75 provided to the underside of the elevated region 71. It is believed that: (i) the lesser thickness T1 of the laminate coating 75 provided to the underside of the elevated region 71 (or the planar membrane 15 shown in FIG. 3), and/or (ii) the height of the elevated region 71 causing greater relative insertion of the piercing member 27 described below into the membrane 15, promotes reliable puncturing of the membrane 15 (and laminate coating 75) and the establishment of fluid communication between the valve body 30 and the paint container 10.

Figures 38, 39:
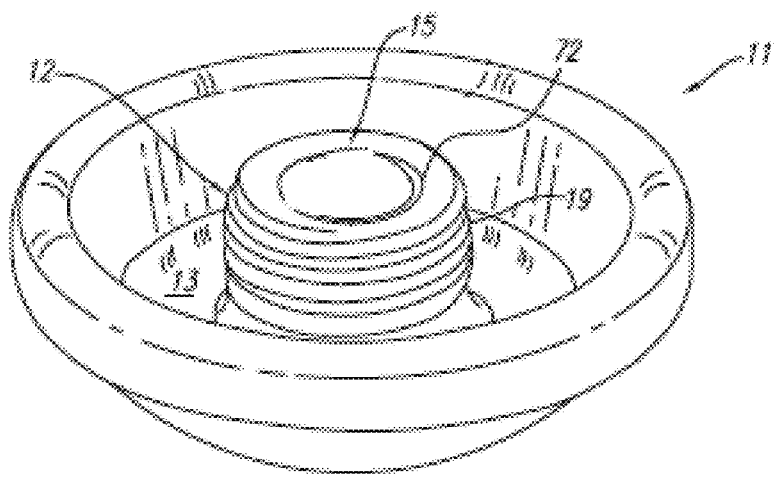
FIG. 38 is a top perspective view of another embodiment of a container cap.
FIG. 39 is a cutaway view of the embodiment of the container cap shown in FIG. 38, placed over a rim of a paint container before the container cap is secured to the paint container to enclose the interior space of the paint container storing paint and a propellant.

The embodiments of the container cap 11 discussed above with respect to FIGS. 19 and 20 include a membrane 15 with an elevated region 71, and a laminate coating 75 applied to the underside of the container cap 11. Alternate embodiments of the container cap 11', such as that shown in FIG. 38 for example, can optionally not include one or both of the elevated region 71 and the laminate coating 75. For example, the container cap 11' in FIG. 38 can optionally include a gasket 81 disposed within the annular channel 70 defined by the container cap 11', as shown in FIG. 39. The gasket 81 can be made from an elastically-compressible material, that is to be compressed between a portion of the container cap 11' defining the annular channel 70 and a portion of the paint container 10. When the portion of the paint container 10 and/or portion (e.g., a rim 80) of the container cap 11' forming the annular channel 70 is/are deformed to seal the interior of the paint container 10, the gasket 81 is compressed there between.

Examples of the gasket 81 include a lathe-cut annular ring, cut from a sheet of polymeric material with suitable elastomeric properties to form a virtually-airtight seal between the container cap 11' and the paint container 10. Being lathe-cut, the gasket 81 can have a generally rectangular cross section. However, alternate embodiments of the gasket 81 include an O-ring, which is molded, extruded or otherwise formed to have a ovular, or circular cross-sectional shape.

The embodiment of the container cap 11' shown in FIG. 39 also includes a membrane 15 formed as a generally-planar region 85 surrounded by the annular sealing surface 74, instead of the elevated region 71. Generally planar means that the membrane 15 can be planar, with a substantially-uniform material thickness between diametrically-opposed portions of the sealing surface 74. Generally planar also means that the membrane 15 can include a thinned region, with a smaller material thickness near a central region of the membrane than a relatively-larger material thickness adjacent to a portion a portion of the perimeter defined by the sealing surface 74. The laminate coating 75 can optionally be applied to the underside of the present embodiment of the container cap 11' as described elsewhere herein instead of, or in addition to the use of the gasket 81.

Figure 26:
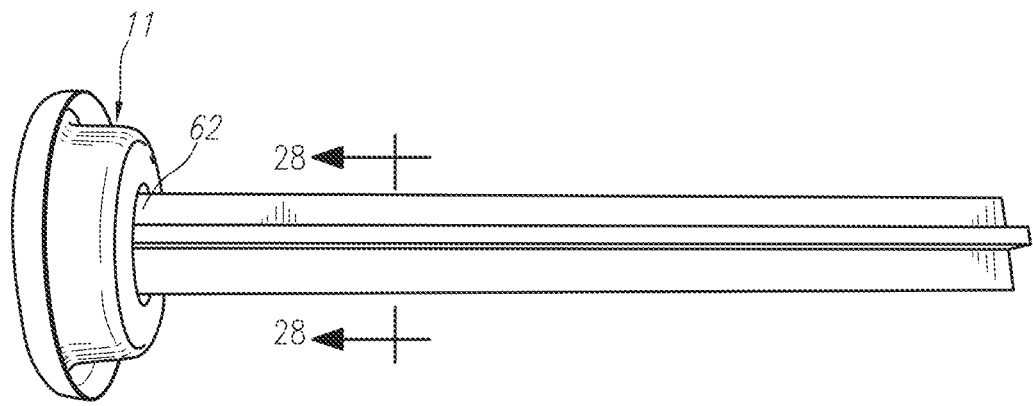
FIG. 26 is a side view of a handling member provided to a container cap to facilitate handling of the container cap by a machine during production of a paint container.
Figure 27:
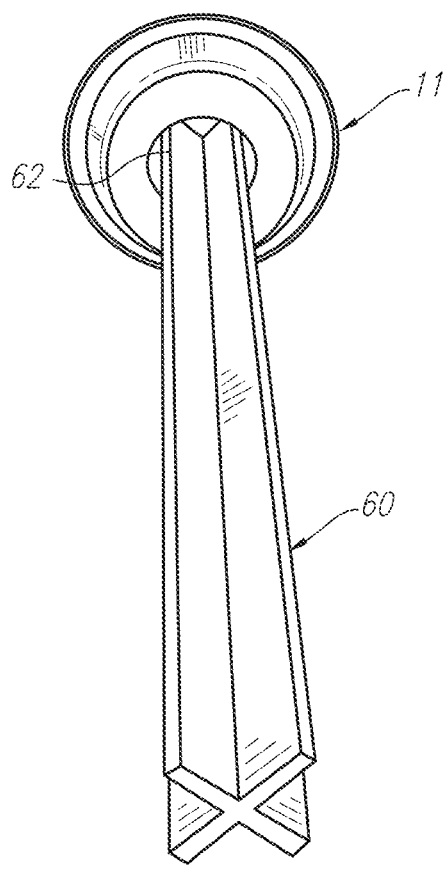
FIG. 27 is an end view of a handling member extending into an interior of a coupling element formed as part of a container cap to allow propellant and paint within a paint container to enter the interior of the coupling element.

To facilitate machine handling and transportation of the container cap 11, a handling member 60, shown in FIGS. 26 and 27, can optionally be provided with a first longitudinal end region 62 extending into the bore 14 (FIG. 6) defined by the coupling element 12 of the container cap 12. The handling member 60 can be an elongate structure formed by extruding, molding, etc., any plastic material with suitable rigidity to maintain its shape in the absence of an external force. The rigidity of the material chosen can also be considered in combination with the cross-sectional shape and other dimensions of the handling member 60 to allow the handling member 60 to bend or otherwise deform without breaking when subjected to a grasping force by a mechanical arm used to transport the container cap 11 and position it above the rim 80 (FIG. 23) during manufacturing of the paint container 10 as discussed below. Deformation of the handling member 60 can be at least partially elastic, causing the handling member 60 to return to a substantially linear shape once the external force causing deformation has been removed. Illustrative embodiments of the handling member 60 can be formed as a plastic component that is at least partially inserted into the bore 14, extending outwardly from the bore 14 at least one half (½ in.) of an inch, or at least one (1 in.) inch. The handling member 60 optionally extend up to about eight (8 in.) inches, or up to about seven (7 in.) inches, or up to about six (6 in.) inches, or up to about five (5 in.) inches, or up to about four (4 in.) inches, etc., from the bore 14. The handling member 60 can also optionally be formed as a solid structure, lacking any cylindrical internal passage fully defined by the handling member 60 alone through which the paint and propellant pass en route to being sprayed from the paint container 10. The extent to which the handling member 60 extends from the bore 14 can be dependent upon the height of the paint container 10 in which the handling member 60 is to be enclosed. For example, if the height of the paint container is eight (8 in.) inches, the length of the portion of the handling member 60 extending from the container cap 11 must be less than eight (8 in.) inches. Alternate embodiments of the handling member 60 can be integrally formed as a monolithic unit with the container cap 11, and optionally protrude from any underside region of the container cap 11 other than the portion of the coupling element 12 defining the bore 14.

Figure 28:
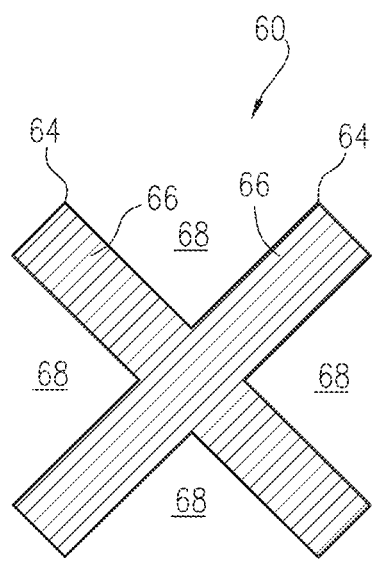
FIG. 28 is a sectional view of the handling member taken along line 28-28 in FIG. 26.

For embodiments of the handling member 60 extending into the bore 14, at least the longitudinal end region 62, and optionally a majority or the entire length of the handling member 60, can have a cross-sectional shape that prevents complete blockage of the bore 14 while received therein. For example, the cross-sectional shape of the longitudinal end region 62 or other portion of the handling member 60 can resemble an X as shown in FIG. 28. The distal regions 64 of the intersecting segments 66 contact the periphery of the coupling element 12 defining the bore 14 to establish a friction fit that maintains the handling member 60 within the bore 14. The channels 68 defined between the intersecting segments 66 form passages through which the paint and propellant can enter the bore 14 and exit the paint container 10 through the punctured membrane 15 during spray application of the paint. Rather than defining a cylindrical interior passage through which paint and propellant flow, which is absent from the present handling member 60, the channels 68 allow the paint and propellant to flow around the handling member 60 instead of through it. Although the embodiment of the handling member 60 shown in FIGS. 26-28 has a cross section resembling an "X", defining four channels 68, the present disclosure is not so limited. The handling member 60 can be formed with an end region 62 having any shape suitable to be received within the bore 14 to couple the handling member 60 to the container cap 11, yet allow paint and propellant within the paint container 10 to enter and pass through the bore 14 during a spray painting application. With reference now to FIGS. 1, 4A, 4B and 6, embodiments of adaptor 20 will now be described. Adaptor 20 may be, in some embodiments, a generally cylindrically shaped component with a top and an opposing bottom. Referring to FIG. 4B, located on the bottom of adaptor 20 may be a coupling element 21. Coupling element 21 may engage with coupling element 12 of container cap 11. In one specific embodiment, shown, coupling element 21 may be formed on an inner cylindrical shaped portion of adaptor 20 and may have a threaded section 57. The adaptor 20 may have a fluid passage bore 26 that may extend from the top to the bottom of the adaptor 20. The adaptor 20 may also have a piercing member 27 used to pierce membrane 15 (shown unpierced in FIG. 3 and pierced in FIG. 6). The piercing member, in some embodiments, may be located concentric to the longitudinal axis of fluid passage bore 26 and may extend beyond bottom surface of fluid passage bore 26. The piercing member may be positioned at least partially within the adaptor bore 26. On the end of piercing member 27 that extends beyond the bottom surface of bore 26, a tip may be formed and configured to pierce membrane 15. The adaptor 20 may also have a seal or gasket 23 that interferes with, and optionally prevents the escape of propellant and/or paint except through the bore 26. The gasket 23 may be formed of an elastomeric material.

The threading provided to the threaded section 57 of the adaptor 20 engages compatible threading provided to the paint container (e.g., threading 19 provided to the coupling element 12 of the container cap 11) to couple the fluid dispensing apparatus 50 to the paint container 10. As the adaptor 20, and accordingly the various embodiments of the valve body 30, 30', 30" described herein, are brought together during installation through cooperation between the respective threaded sections, the piercing member 27 is caused to puncture the membrane 15 substantially simultaneously with compression of the gasket 23 against the sealing surface 74 of the coupling element 12. Premature contact between the gasket 23 and the sealing surface 74 may interfere with sufficient insertion of the piercing member 27 to puncture the membrane 15. However, recessing the gasket 23 too far into the adaptor 20 may prevent the gasket from reaching the sealing surface 74 of the coupling element 12, thereby allowing propellant to leak between the fluid dispensing apparatus 50 and the container cap 11. Thus, the arrangement of the gasket 23, piercing member 27 and the threaded section 57 of the adaptor 20 can be arranged to cause the gasket 23 to contact the sealing surface 74 approximately simultaneously (e.g., within one rotation of the adaptor 20 relative to the coupling member 12, or within three-quarters, half or one quarter rotation of the adaptor 20 relative to the coupling member 12, etc.) with the puncture of the membrane 15 by the piercing member 27. Engagement between the threading provided to the adaptor 20 and the coupling member 12 can define a range of travel of the fluid dispensing apparatus 50 relative to the paint container 10 during installation. The piercing member 27 can be arranged to puncture the membrane 15 and the gasket can be arranged to be compressed against a portion of the container cap 11 along that range of travel.

Figure 4A:
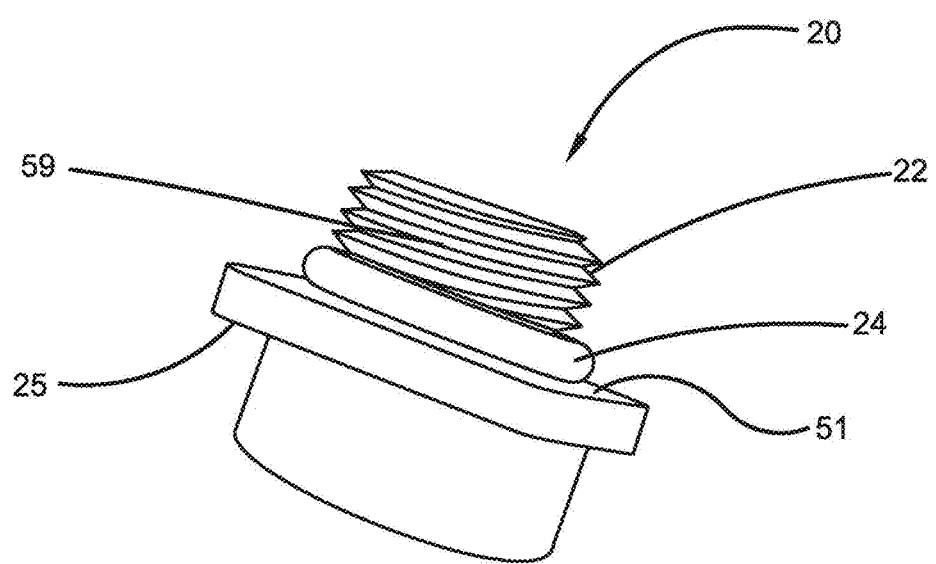
FIG. 4A is a perspective side view of an adaptor in accordance with some embodiments of this invention.
Figure 4B:
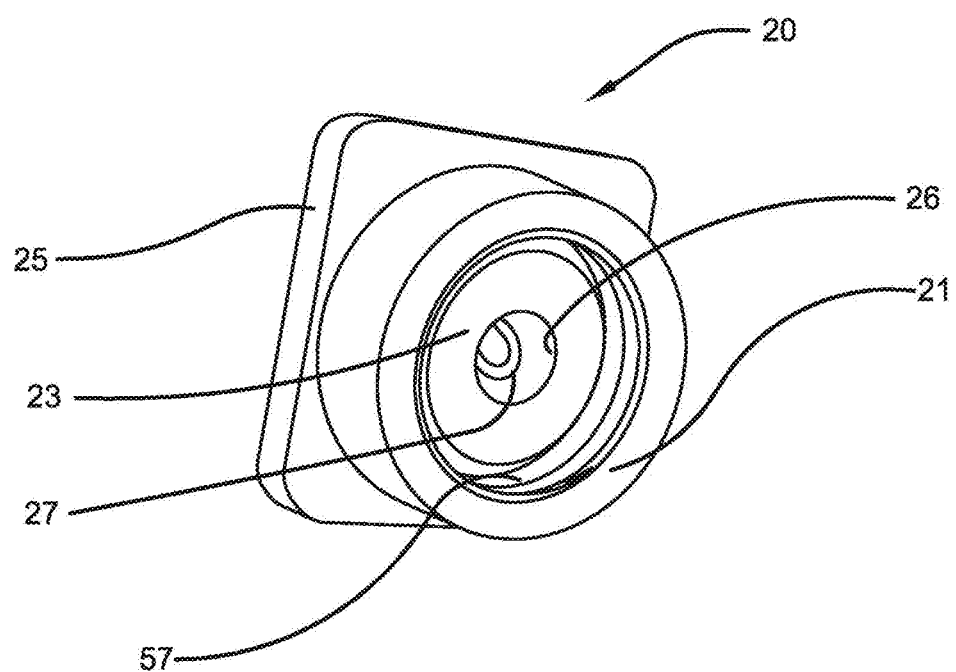
FIG. 4B is a perspective bottom view of an adaptor in accordance with some embodiments of this invention.

With reference now to FIG. 4A, located on the top of the adaptor 20 may be a coupling element 22. In one specific embodiment, shown, coupling element 22 may be formed on an outer cylindrical shaped portion of adaptor 20 and may have a threaded section 59. The coupling element 22 may be used to engage with a coupling element of the valve body 30, as will be discussed further below. A seal 24 may be used to seal the connection between the top of the adaptor 20 and the bottom of the valve body 30. For the embodiment shown, the seal 24 is an O-ring received around the cylindrically shaped portion of the adaptor 20 that has the coupling element 22. The seal 24 may be formed of an elastomeric material. The adaptor 20 may have a shoulder 25 extending outwardly, as shown. The top of the shoulder 25 may have a surface 51 that acts as a stop that contacts a surface of the valve body 30 when the adaptor 20 and valve body 30 are attached together. The adaptor 20 may be formed of any material(s) chosen with the sound judgment of a person of skill in the art. In one embodiment, the adaptor 20 is formed of copper.

Figure 5:
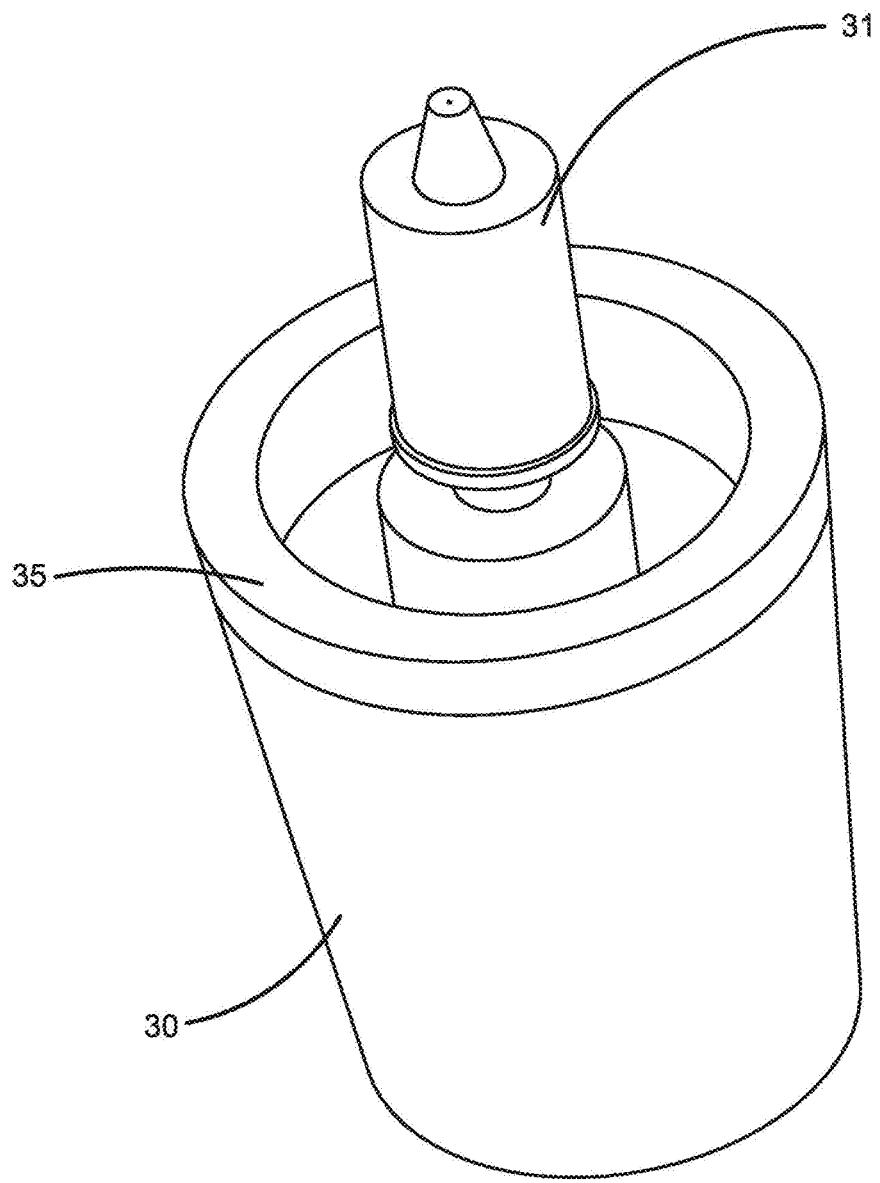
FIG. 5 is a perspective view of a dispensing apparatus in accordance with some embodiments of this invention.
Figure 10:
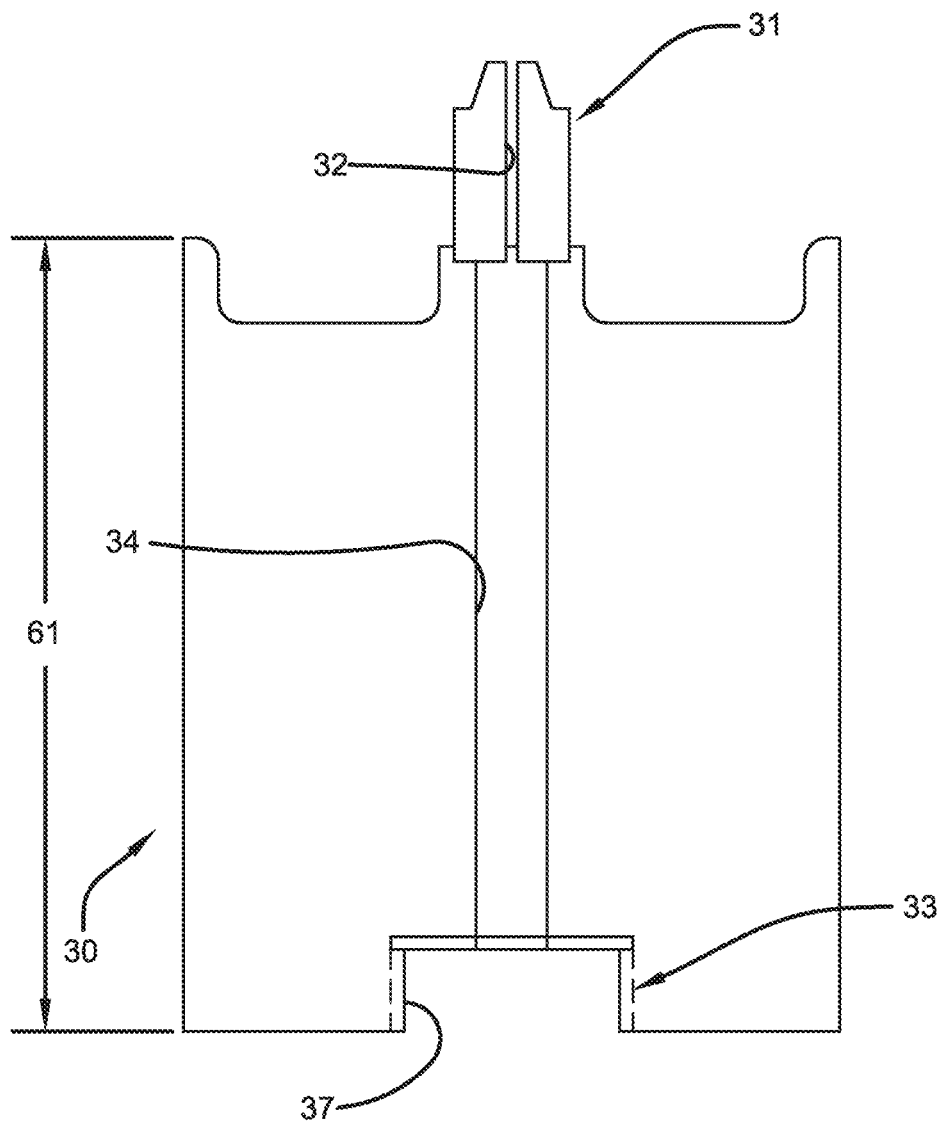
FIG. 10 shows a sectional view of a valve body in accordance with some embodiments of this invention.

With reference now to FIGS. 1, 5 and 10, embodiments of the valve body 30 will now be described. The valve body 30 may have a valve cap 35 on its top, as shown. The valve cap 35 may have any design suitable to properly receive the nozzle 31 as chosen by a person of skill in the art. In one embodiment, shown, the valve cap 35 is similar in design to the top of the can 200, just below the nozzle 202, shown in FIG. 2. The valve body 30 may be substantially cylindrical in shape and may have a height 61. The height 61 may range between 1.0 to 4.0 inches. Valve body 30 may have a fluid passage bore 34, as shown in FIG. 10. The bore 34 may extend from bottom to the top of the valve body 30, as shown. In one embodiment, the bore 34 may be centered along the valve body's longitudinal axis. A coupling element 33 may be located on a bottom surface, as shown. In one specific embodiment, shown, coupling element 33 may be formed on an inner cylindrical shaped portion of valve body 30 and may have a threaded section 37. The coupling element 33 may be used to engage with coupling element 22 of the adaptor 20. In one specific embodiment, threaded section 37 engages threaded section 59 to attach the valve body 30 to the adaptor 20. The valve body 30 may be formed of any material chosen with the sound judgment of a person of skill in the art.

Figure 2:
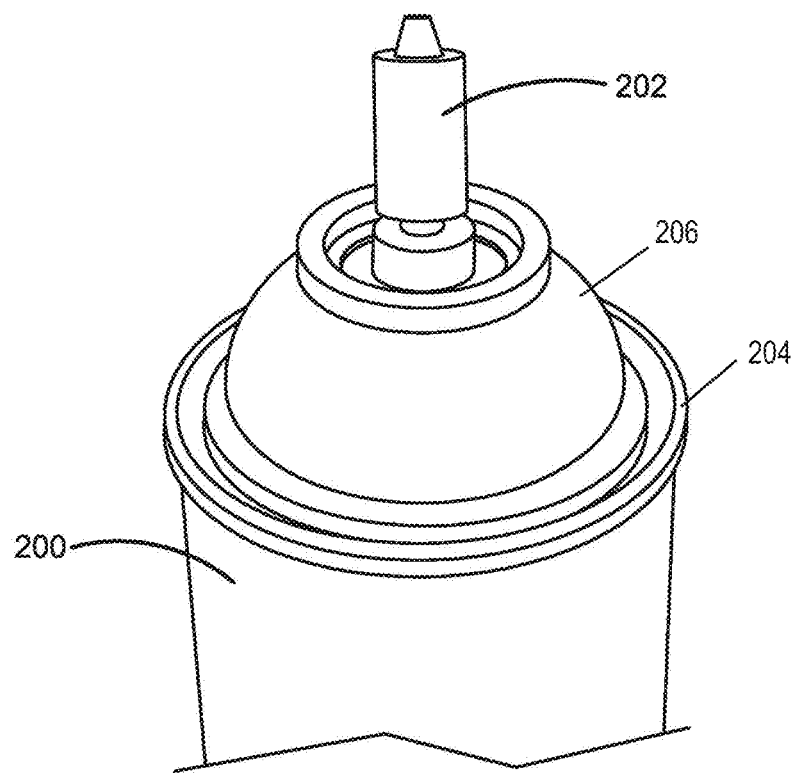
FIG. 2 is a perspective top view showing a prior art paint can and nozzle.

With reference now to FIGS. 1, 5 and 10, the nozzle 31, which may have a fluid passage bore 32, may be joined to the valve cap 35 in a known manner—similar to how the nozzle 202 is joined to can 200 in FIG. 2. Nozzle 31 may dispense paint out of the valve body 30 to the ambient when the nozzle 31 is operated in a known manner (similar to nozzle 202 in FIG. 2). Specifically, nozzle 31 may be configured such that it can be selectively deflected from its longitudinal axis and when so deflected its bore 32 is in fluid communication with central bore 34. Nozzle 31 may be configured such that it is capable of being deflected by manually generated forces. Nozzle 31 may also be configured with a biased position such that when no force is applied, nozzle 31 returns to a position that prevents fluid communication with central bore 34.

Figure 11:
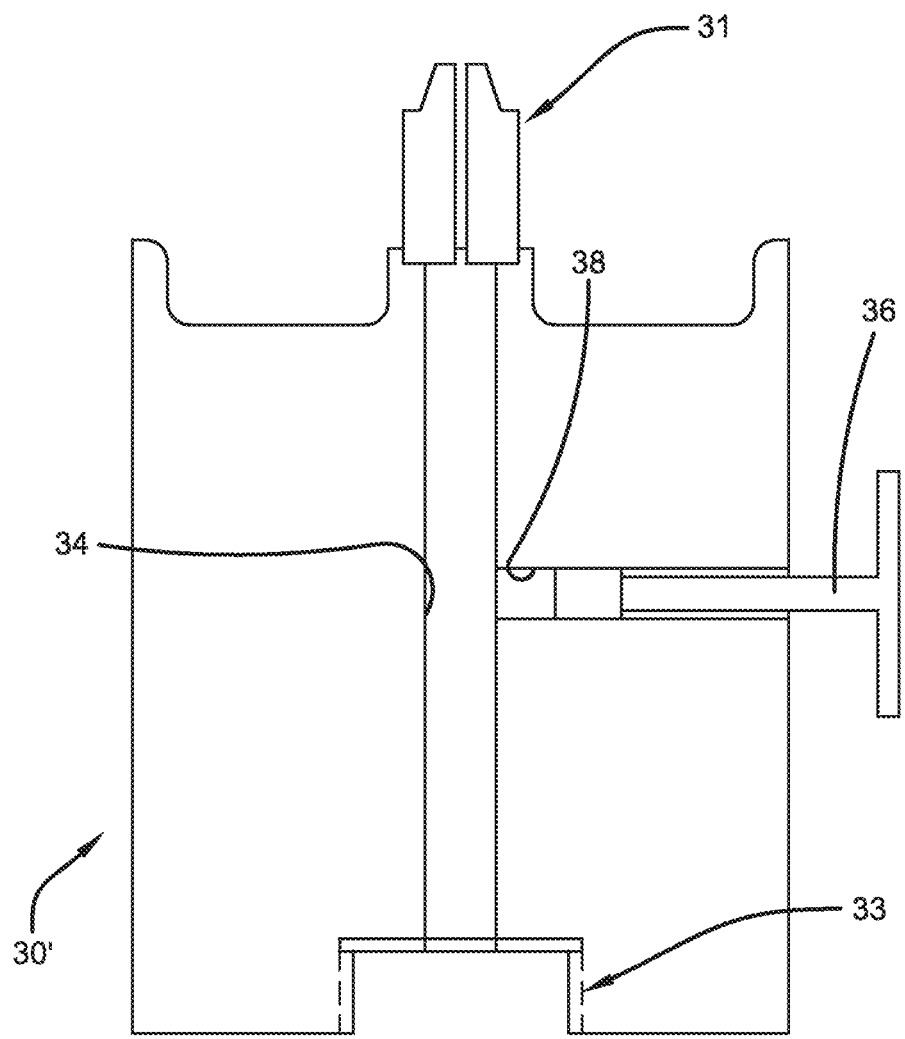
FIG. 11 shows a sectional view of a valve body with pressure relief valve in accordance with some embodiments of this invention.

FIG. 11 illustrates another embodiment valve body 30'. Valve body 30' is similar to valve body 30 described above except that it may include a pressure relief valve 36. In this embodiment valve body 30' may include a transverse fluid passage bore 38. Bore 38 may communicate on one end with bore 34 and on the opposing end with the area outside of the confines of valve body 30'. Located in bore 38 may be pressure relief valve 36. Pressure relief valve 36 may be chosen to operate in a plurality of modes. One mode may be such that in an initial condition relief valve 36 substantially seals bore 38 from the area outside. A second mode may be, once the user depresses relief valve 36, transverse bore 38 connects central bore 34 with the area outside of the confines of valve body 30'. Operating in this second mode, when attached to valve body 30', the pressure inside container 10 is minimized or released to the ambient without the fluid also being dispensed to the ambient. A third mode is the relief valve 36 opens automatically when pressure inside the paint container 10 exceeds a predetermined value. When this occurs, the pressure inside container 10 is minimized or released to ambient. Materials used in forming pressure relief valve 36 may be chosen with the sound judgment of a person of skill in the art. The operation modes of pressure relief valve 36 may also be chosen with the sound judgment of a person of skill in the art.

Figure 14:
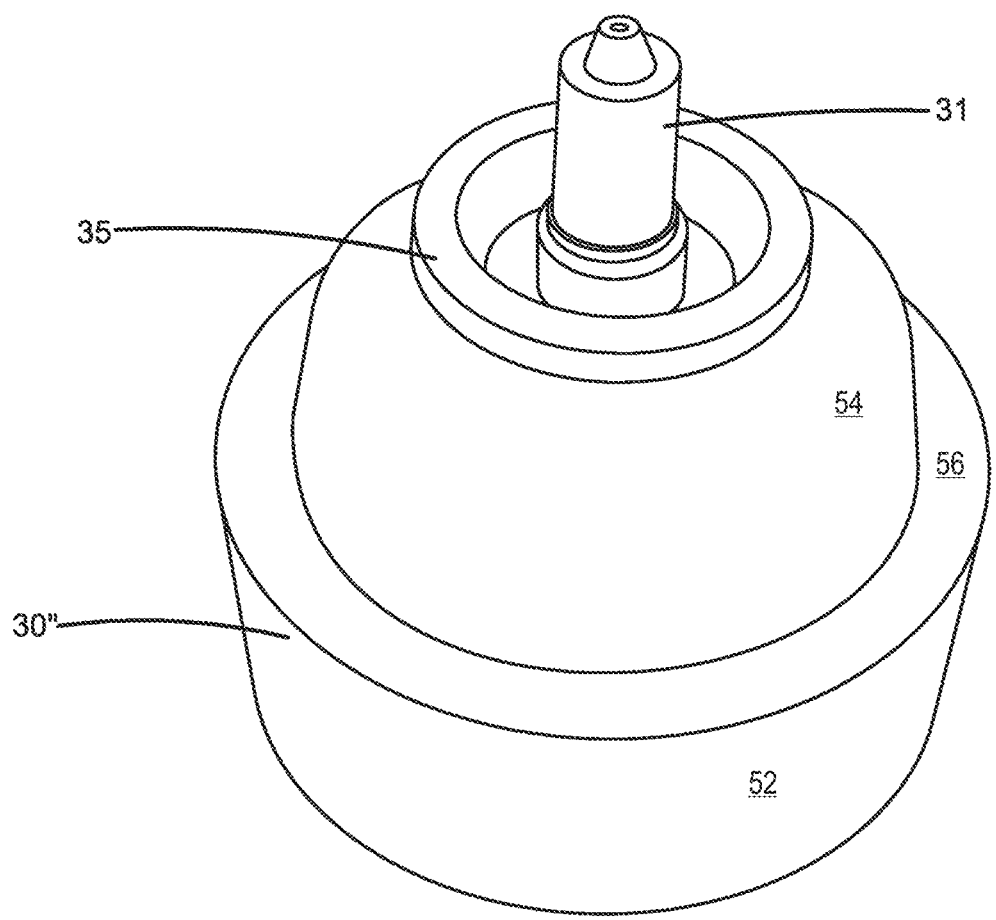
FIG. 14 is a top perspective view of a valve body according to some embodiments of this invention.
Figure 15:
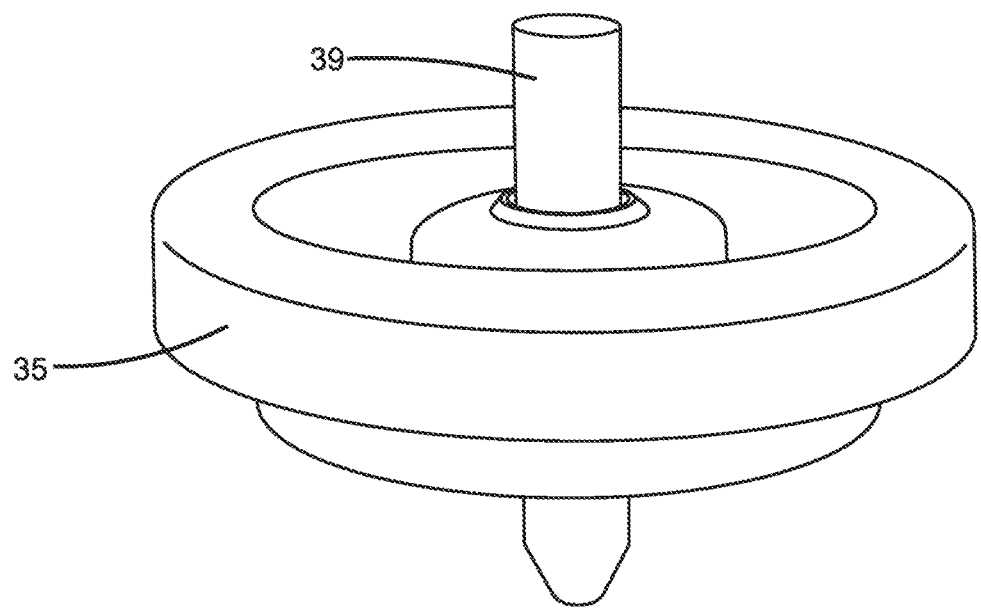
FIG. 15 is a side perspective view of a valve cap according to some embodiments of this invention.

With reference now to FIGS. 14 and 15, another embodiment valve body 30" is shown. Valve body 30" of the present embodiment has a valve cap 35 and attaches to a nozzle 31 as with previously described valve bodies 30 and 30'. Valve body 30", however, is designed to resemble the size and shape of the container. Compare FIG. 14 with FIG. 2. FIG. 15 shows stem 39 which extends through the valve cap 35 and is used to operate nozzle 31 in a known manner.

As shown in FIG. 14, the valve body 30" includes a generally-cylindrical region 52 and a domed region 54 recessed radially inward, forming a step 56 at the interface between the cylindrical region 52 and the domed region 54. The cylindrical region 52 has an outside diameter that is approximately equal to the outside diameter of a rim 204 (FIG. 2) of the can 200, and extends circumferentially around at least a portion of a top region 206 of the can 200 while the valve body 30" is installed on the can 200. The domed region 54 can have an outside diameter that gradually decreases along an axial direction from the step 56 toward the valve cap 35. Although referred to as being domed, the domed region 54 is not necessarily hemispherical in the shape of a true dome, but can optionally include a tapered region, a frustoconical region, or otherwise configured to establish a shorter outside diameter adjacent to the valve cap 35 than adjacent to the cylindrical region 52.

Figure 21:
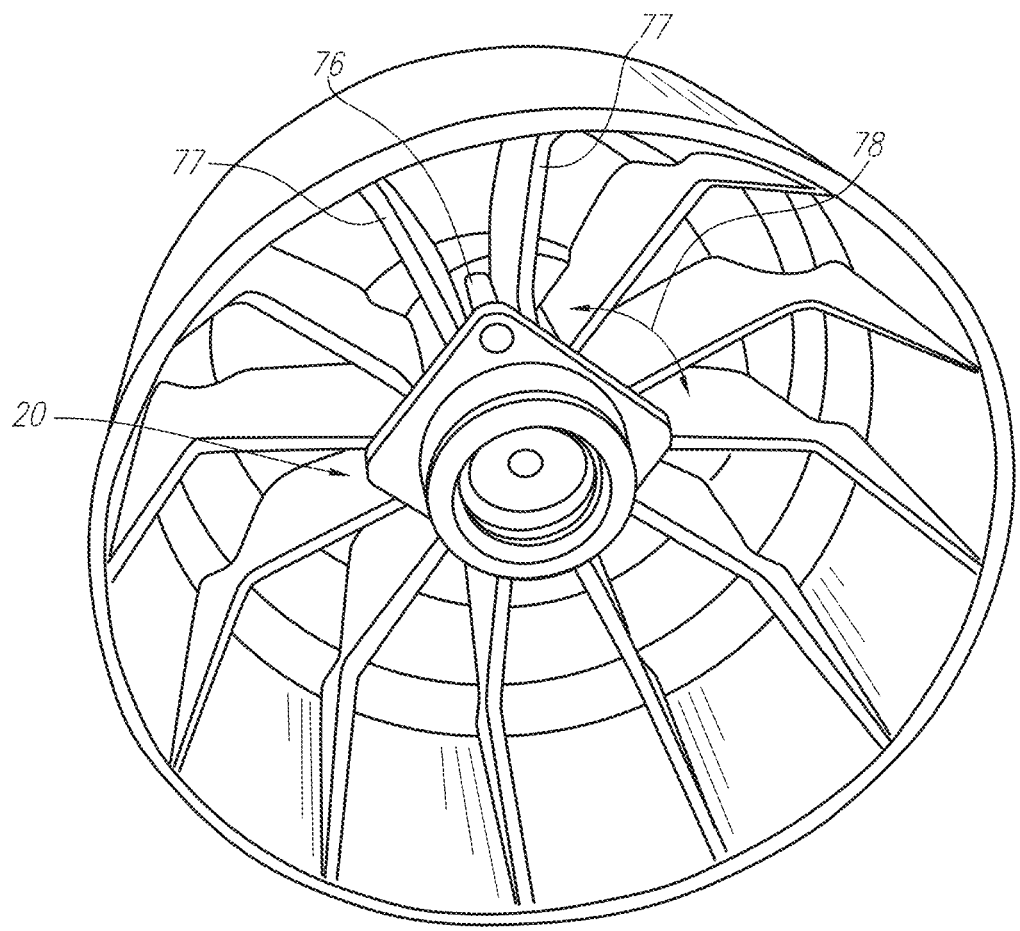
FIG. 21 is a bottom perspective view of the valve body shown in FIG. 14.

A bottom view of the valve body 30" is shown in FIG. 21. The adaptor 20 such as that described above is coupled to the underside of the valve body 30" in fluid communication with a valve mechanism housed by the valve body 30". For embodiments where the adaptor 20 is not integrally formed with the valve body 30 and/or valve mechanism, rotating the valve body 30" in a counterclockwise direction about the longitudinal axis of the paint can 10 to remove the valve body 30" imparts a force that could cause counterclockwise rotation of the adaptor 20 relative to the valve body 30". Such relative rotation could result in separation of the adaptor 20 from the valve body 30". To interfere with such separation, one or more locking structures 76 such as a post can optionally extend through the shoulder 25 of the adaptor 20 and into the underside (between two reinforcing gussets 77 in FIG. 21) of the valve body 30" to prevent rotation of the adaptor 20 relative to the valve body 30" in the directions indicated by arrows 78, during installation and removal of the fluid dispensing apparatus 50.

In one specific embodiment, shown, coupling element 22 may be formed on an outer cylindrical shaped portion of adaptor 20 and may have a threaded section 59. The coupling element 22 may be used to engage with a coupling element of the valve body 30, as will be discussed further below. A seal 24 may be used to seal the connection between the top of the adaptor 20 and the bottom of the valve body 30. For the embodiment shown, the seal 24 is an O-ring received around the cylindrically shaped portion of the adaptor 20 that has the coupling element 22. The seal 24 may be formed of an elastomeric material. The adaptor 20 may have a shoulder 25 extending outwardly, as shown. The top of the shoulder 25 may have a surface 51 that acts as a stop that contacts a surface of the valve body 30 when the adaptor 20 and valve body 30 are attached together. The adaptor 20 may be formed of any material(s) chosen with the sound judgment of a person of skill in the art. In one embodiment, the adaptor 20 is formed of copper.

Figure 36:
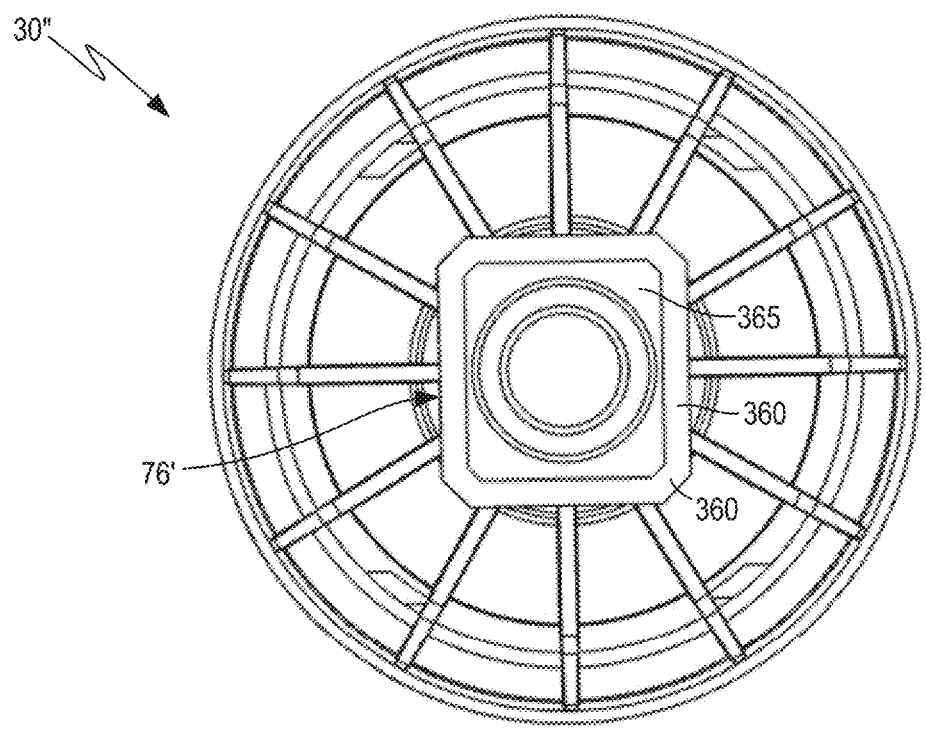
FIG. 36 is a bottom view of an alternate embodiment of the valve body.

The locking structure 76 is described above as a component that is separate from, but engages, a portion of the valve body 30 and a portion of the adaptor 20. However, alternate embodiments of the valve body 30" can include an integrated locking structure 76', an example of which is shown in FIG. 36. According to such embodiments, the locking structure 76' includes an arrangement of walls 360 or other structures defining a recess 365 having a shape that resembles a negative of the external dimensions of the adaptor 20. For example, the embodiment of the locking structure 76' in FIG. 36 includes walls 360 arranged to define a generally rectangular recess 365. As shown in FIG. 4B, the shoulder 25 of the adaptor 20 is also configured in a generally rectangular shape having external dimensions that are smaller than the internal dimensions of the walls 360 defining the recess 365. However, the external dimensions of the shoulder 25 of the adaptor 20 are similar enough to the dimensions of the recess 365 to prevent rotation of the adaptor 20 while at least a portion of the shoulder 25 is disposed within the recess 365. In other words, the rectangular shoulder 25, when angularly oriented in alignment with the rectangular shape of the recess 365, can be seated within the recess 365, and is not rotatable within the recess 365. The rectangular shoulder 25 is not able to be inserted into the recess 365 when rotated an angular extent (e.g., 45°) relative to the angular orientation of the recess 365. The close tolerance between the dimensions of the shoulder 25 and the dimensions of the recess 365 serve to prevent rotation of the adaptor 20 relative to the valve body 30" when fully seated within the recess 265 of the valve body 30".

An example of an adaptor 20 including a rectangular shoulder 25 seated within the recess 365 is shown in FIG. 31. The adaptor 20 is not rotatable relative to the valve body 30" while the adaptor 20 is fully seated within the recess 365. To install the adaptor 20 on the valve body 30" within the recess 365, the adaptor 20 is oriented to match the orientation of the recess 365, thereby allowing at least a portion of the shoulder 25 to be inserted into the recess 365. A coupling element 22, described above as including external threading 59 with respect to FIG. 4A, can be provided to the adaptor 20, optionally as a cylindrical member 315 with internal threading 317. The cylindrical member 315 can extend in an upward direction from the shoulder 25 toward the valve cap 35 supported atop a neck region 84 of the valve body 30".

The valve cap 35 of the embodiment shown in FIG. 31 can include a cylindrical conduit 318 provided with external threading 319 that is compatible with the internal threading 317 of the cylindrical member 315. The valve cap 35 can be coupled to the adaptor 20 for such embodiments by seating the adaptor 20 in the recess 365, and positioning the valve cap 35 such that the cylindrical conduit 318 of the valve cap 35 is axially aligned with the cylindrical member 315 of the adaptor 20 within an internal passage defined by the valve body 30". Because the angular orientation of the adaptor 20 is substantially fixed as a result of a portion of the shoulder 25 being arranged within the recess 365, the valve cap 35 can be rotated. Rotation of the valve cap 35 causes the external threading 319 and the internal threading 317 to cooperate, urging the valve cap 35 and the adaptor 20 towards each other. A collar 320 provided about a top rim of the valve cap 35 can be crimped over top of, or otherwise deformed about a portion of the neck region 84 of the valve body 30" to further secure the connection between the valve cap 35 and the valve body 30".

Although the example described above utilizes a threaded connection between the valve cap 35 and the adaptor 20, the connection between the valve cap 35 and the valve body 30" can optionally maintain communication between the valve cap 35 and the adaptor 20 in the absence of such a threaded connection according to other embodiments. For example, the cylindrical conduit 318 can simply be axially aligned with the cylindrical member 315 of the adaptor, lacking a fastening system that joins the cylindrical conduit 318 and the cylindrical member 315 together. The cylindrical conduit 318 can optionally overlap with the cylindrical member 315 (e.g., an end of the cylindrical conduit 318 can be received within an end of the cylindrical member 315, or vice versa), or an end of the cylindrical conduit 318 can be spaced apart from an end of the cylindrical member 315 in an axial direction. For such embodiments, the crimp of the collar 320 over the neck region 84 of the valve body 30" can couple the valve cap 35 to the valve body 30", and the adaptor 20 can be molded in a seated position within the recess 365, adhesively secured seated within the recess 365, or otherwise installed on the valve body 30".

Figure 37:
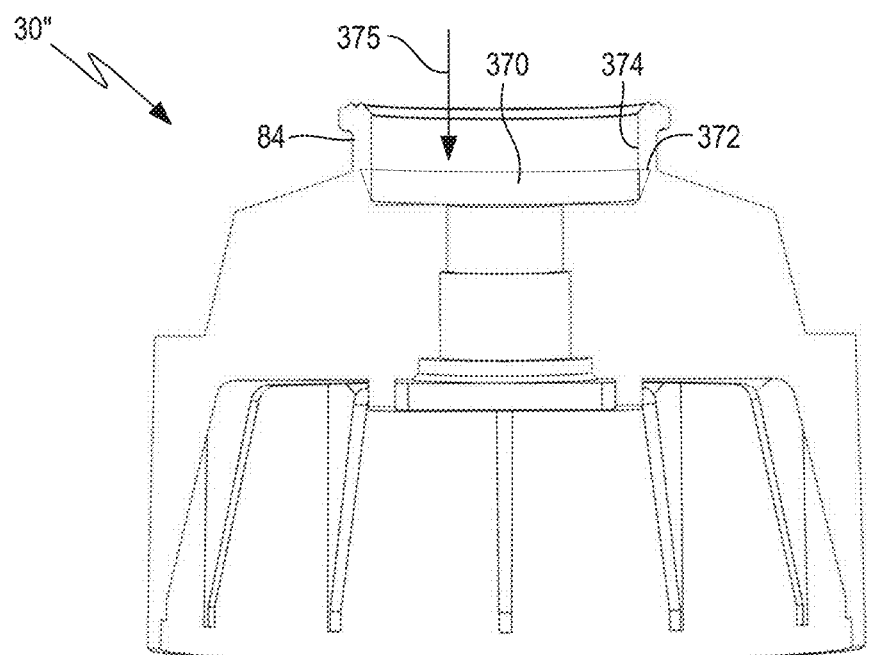
FIG. 37 is a sectional view of another embodiment of a valve body taken along line 31-31 in FIG. 30.

Embodiments of the valve body 30" can optionally include a receiving aperture 370, shown in FIG. 37, which receives a snap-fit embodiment of the valve cap 325. The snap-fit embodiment of the valve cap 325 is described below with reference to FIG. 32. The receiving aperture 370 can be formed adjacent to a base of the neck region 84. The receiving aperture 370 can be configured to allow one-way adjustment (e.g., insertion) of the valve cap 325, but interfere with removal of the valve cap 325 in the opposite direction without damaging or deforming the valve body 30". For example, as shown in FIG. 37, the receiving aperture 370 is defined by a horizontal wall 372 formed in the neck region 84. The horizontal wall 372 is substantially perpendicular to the vertical wall 374 defining an interior of the neck region 84. Inserting the valve cap 325 as described below in a downward direction, indicated generally by arrow 375, from a rim of the neck region to the receiving aperture 370 causes a portion of the valve cap 325 to extend into the receiving aperture 370. Once the portion of the valve cap 325 is received within the receiving aperture 370, the horizontal wall 372 impedes movement of the valve cap 325 in the opposite direction.

An illustrative embodiment of the valve cap 325 is shown in FIG. 32. The present embodiment of the valve cap 325 can optionally include an adaptor region 326 and a valve cap region 327 integrally formed together as part of the same monolithic structure. The adaptor region 326 serves in a capacity similar to the adaptor 20 described above, and includes the piercing member 27 that punctures the membrane 15, etc. Further, the valve cap region 327 cooperates with the neck region 84 of the valve body 30" and supports the nozzle 31.

A flange 328 protrudes radially outwardly from a top portion of the adaptor region 26, and includes a generally-horizontal top surface 329. The top surface 329 is configured to be substantially parallel with the horizontal wall 372 of the receiving aperture 370 when the valve cap 325 is installed on the valve body 30". A deformable collar 321 extends about a rim 322 at the top of the valve cap 325, and is crimped over the neck region 84 of the valve body 30" to seal the interior of the neck region 84.

To install the valve cap 325, the adaptor region 326 is inserted into the neck region 84 in the direction indicated generally by arrow 375 in FIG. 37. The diameter of the flange 328, at its widest point at the outermost end of the top surface 329, spans at least the entire diameter inside the neck region 84. Friction between the outermost end of the top surface 329 and the vertical wall 374 may make insertion of the adaptor region 326 through the neck region 84 difficult, and may result in elastic deformation of the vertical wall 374 during insertion of the flange 328 through the neck region 84. Upon being fully inserted, the flange 328 is received within the receiving aperture 370, and the vertical wall 374 elastically recovers, at least partially, to an unbiased state of the vertical wall 374 prior to insertion of the valve cap 325. The top surface of the flange 328, while disposed within the receiving aperture 370, opposes and is substantially parallel to the horizontal wall 372 of the receiving aperture 370. Contact between the parallel top surface 329 and the horizontal wall 372 prevents removal of the valve cap 325 in the opposite direction. Once the valve cap 325 is fully seated with the flange 328 in the receiving aperture 370, the collar 321 is crimped over the top of the neck region 84 or otherwise deformed to seal the aperture through which the valve cap 325 was inserted into the neck region 84.

Figure 29:
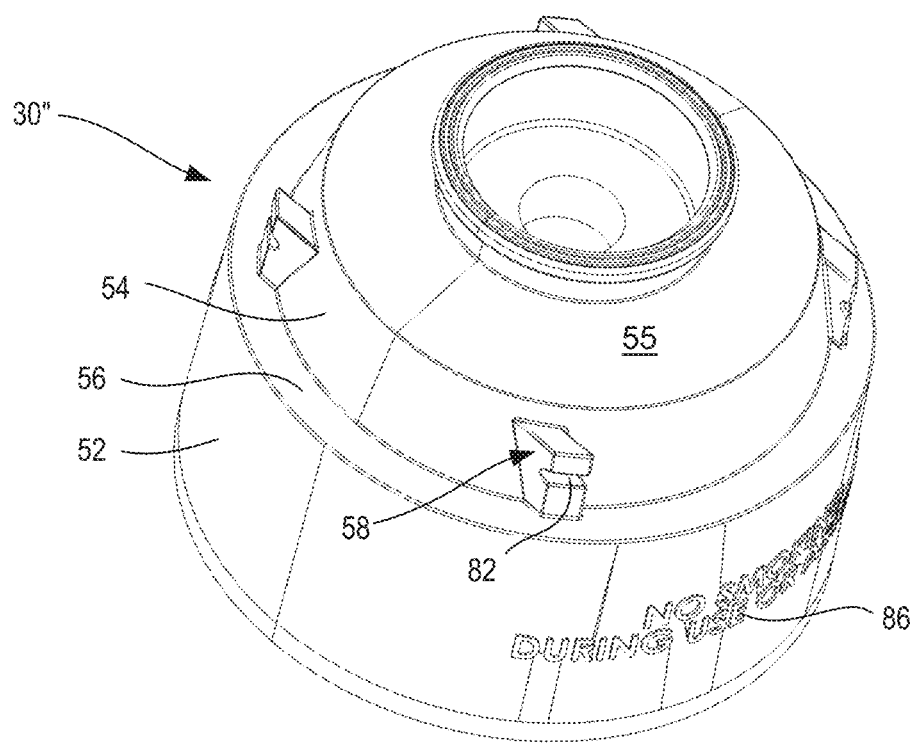
FIG. 29 is a top perspective view of a valve body according to some embodiments of the invention.
Figure 30:
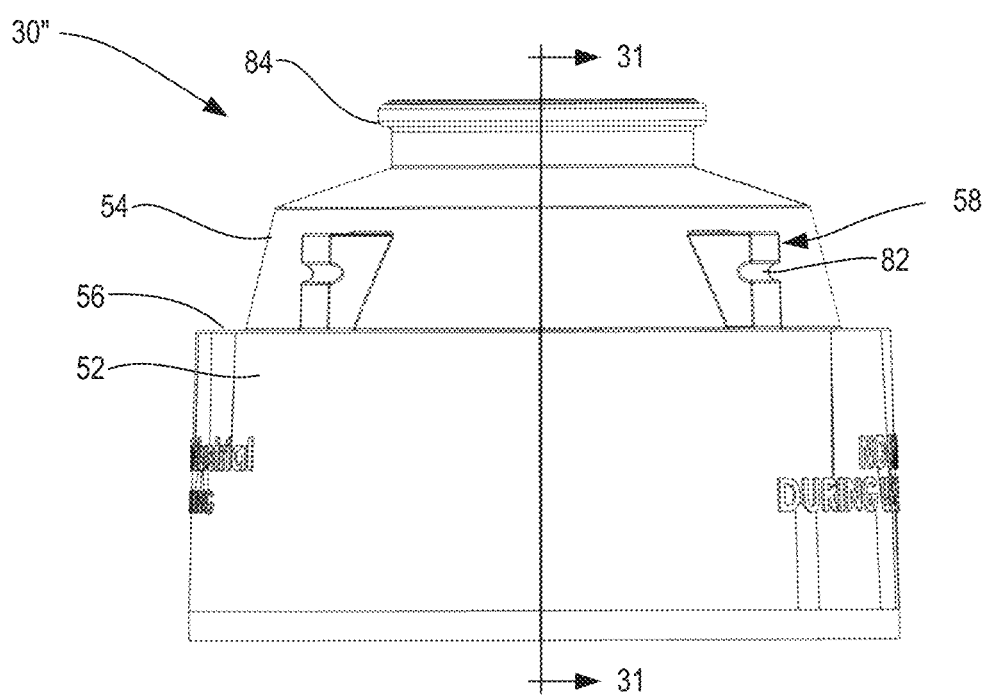
FIG. 30 is a side view of the valve body shown in FIG. 29.
Figure 34:
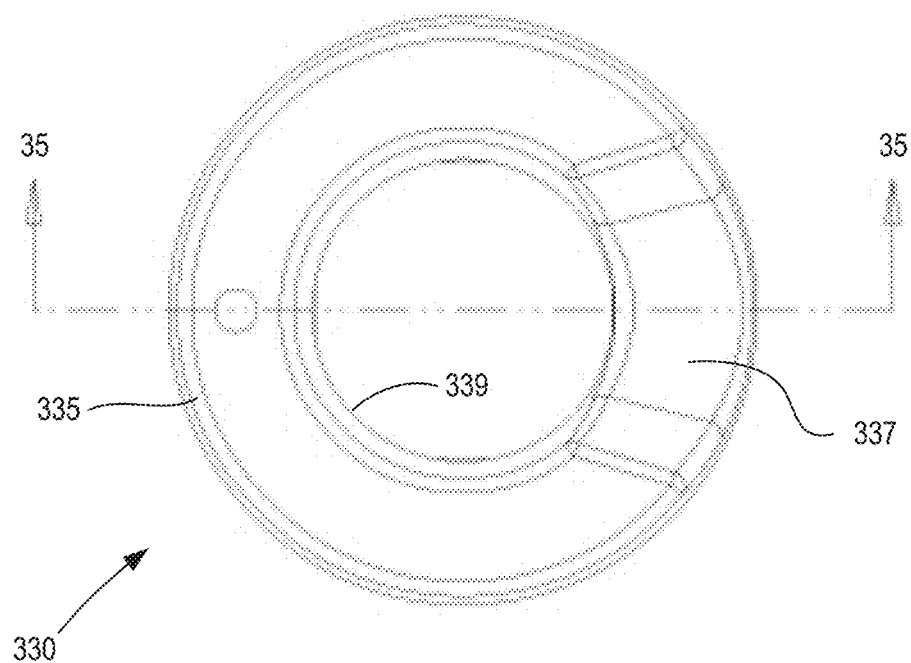
FIG. 34 is a top view of the protective cap shown in FIG. 33.
Figure 35:
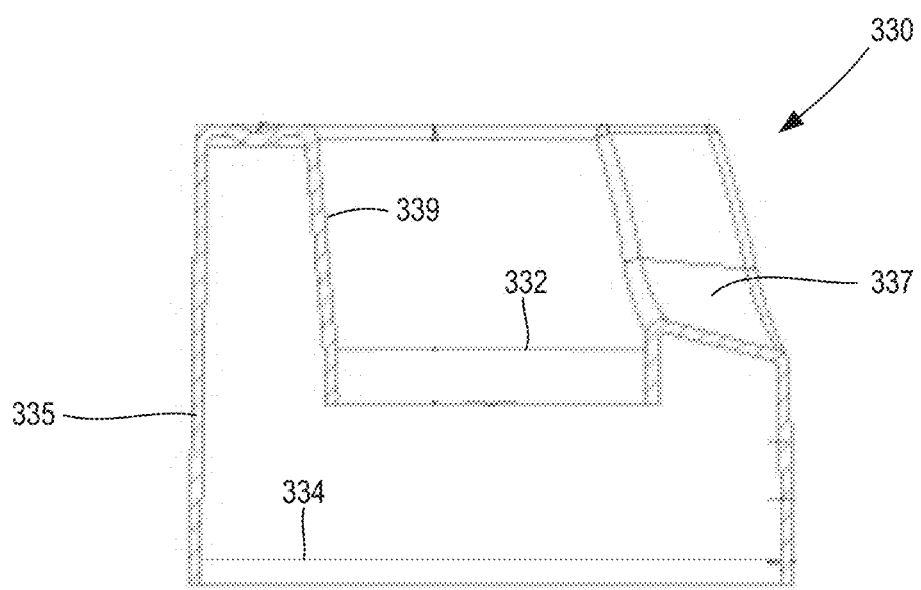
FIG. 35 is a sectional view of the protective cap taken along line 35-35 in FIG. 34.

FIGS. 29 and 30 show another embodiment of the valve body 30" that provides enhanced support for a protective cap 330 (FIGS. 33-35). A warning 86 (FIG. 29) such as "NO SMOKING" or other instructional notification can optionally be indelibly formed, or applied as a painted, printed, stenciled, adhesive decal on one or more of: the cylindrical region 52, the domed region, 54, an upper region 55, any other surface with sufficient surface area, or any combination thereof. Indelibly forming the warning 86 or other notification can involve integrally molding the warning 86 or other notification as part of the same monolithic structure as the cylindrical and/or domed regions 52, 54. So forming the warning 86 or other notification interferes makes removal of the warning 86 or other notification difficult, often requiring physical damage to the valve body 30" (e.g., removal of material forming the valve body 30"), compared to the relatively-easy task of removing an adhesively-applied label, for example.

A plurality (e.g., four in the embodiments shown in FIGS. 29 and 30) of support members 58 can also protrude outward from the domed region 54. As shown, the support members 58 protrude in a radially outward direction from the peripheral wall of the domed region, onto the step 56. Each support member 58 optionally can be integrally formed as part of the same monolithic structure including the domed region 54, to define an aperture 82 that opens in a radially outward direction.

The embodiment of the protective cap 330 shown in FIG. 33 includes a cylindrical external shell 335 that defines a finger notch 337. The nozzle 31 can be manipulated through the finger notch 337 while the protective cap 330 is installed on the can 200. Thus, the protective cap 330 allows for manual manipulation of the nozzle 31, yet protects against manipulation of the nozzle 31 that causes paint to be expelled as a result of inadvertent contact between the nozzle 31 and a foreign object.

FIG. 35 shows a sectional view of the protective cap 330 taken along line 35-35 in FIG. 34. As shown, the protective cap 330 is formed in an annular shape defined by the external shell 335 and an inner wall 339. The inner wall 339 includes a first connector such as a rib 332, tab, or other structure that cooperates with a portion of the valve cap 35, a neck region 84 (FIG. 30) of the valve body 30" that supports the valve cup 35, or another structure to establish a first connection point between the protective cap 330 and the valve cap 35 or other portion of the valve body 30". The protective cap 330 also includes a second connector such as a rib 334 that protrudes inwardly, from an inward-facing surface of the external shell 335. To allow for installation of the protective cap 330 onto the valve body 30" without regard to the angular orientation of the protective cap 30" relative to the valve body 30", the rib 332 and/or the rib 334 can optionally extend entirely about the respective inward-facing surfaces to which the rib 332 and/or the rib 334 is/are provided, as shown in FIG. 35. However, according to alternate embodiments, the rib 332 and/or the rib 334 can be provided to discrete regions, but less than the entire extent of the respective surfaces. With the protective cap 330 is fully installed on the valve body 30", the rib 332 of the first connector cooperates with the valve cup 35, for example, and the rib 334 of the second connector is received within the aperture 82 (FIGS. 29 and 30) defined by the support members 58. The combined holding forces achieved through this cooperation of the ribs 332, 334 and the portions of the valve body 30" is greater than the holding force achieved through the communication between only the rib 332 and the neck region 84.

Figure 7:
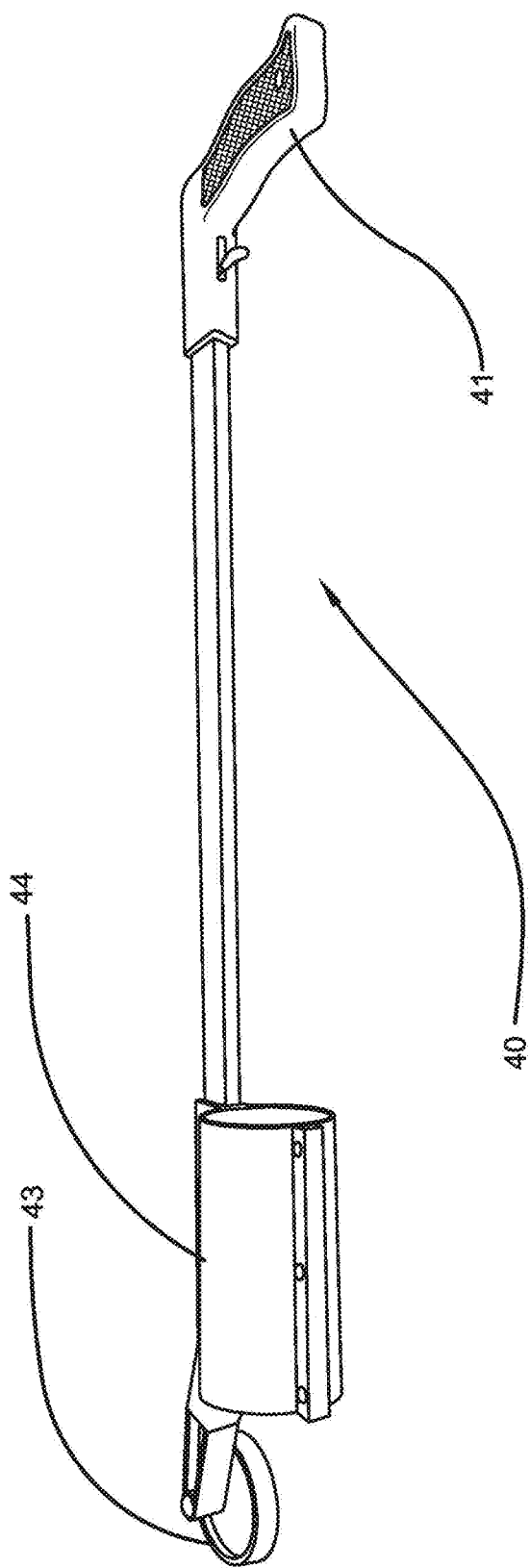
FIG. 7 shows a perspective view of a dispensing wand in accordance with some embodiments of this invention.
Figure 8:
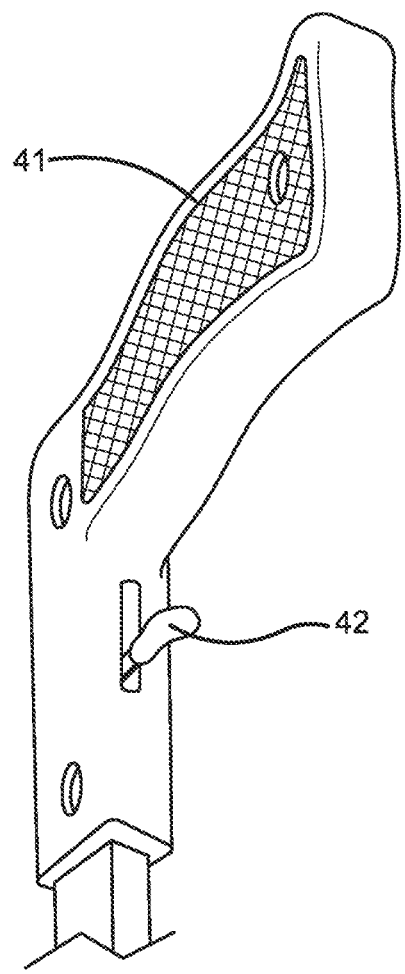
FIG. 8 is a perspective close-up view showing the grip and trigger of a dispensing wand in accordance with some embodiments of this invention.
Figure 9:
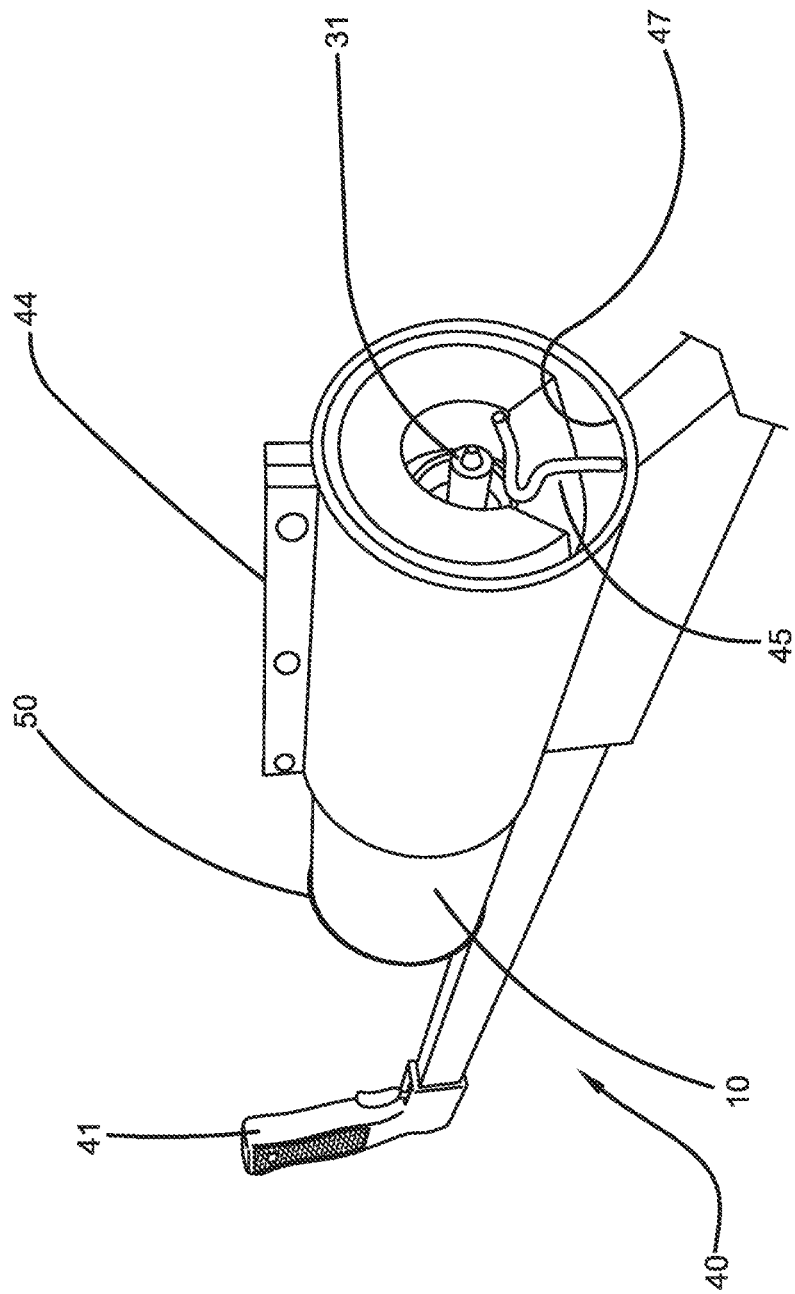
FIG. 9 shows an end perspective view of a dispensing wand in accordance with some embodiments of this invention.

With reference now to FIGS. 7-9, in another embodiment a dispensing wand 40 may be used. On one end of dispensing wand 40 may be positioned a grip 41 configured to allow a user to easily hold wand 40. Also on grip end of wand 40 may be trigger 42, seen best in FIG. 8. The opposing end of wand 40 may contain a wheel 43 which may be rotationally attached to wand 40 in such a manner as to allow wand 40 to easily be moved along a surface by a user as the wheel 43 rolls along the surface. Also on opposing end of wand 40 may be a receiving portion 44 of such a size and shape to securely retain container 10 to the wand 40. While the receiving portion 44 can be of any type chosen with the sound judgment of a person of skill in the art, for the embodiment shown the receiving portion 44 includes an opening 47, see FIG. 9, into which the pressurized container 10 may be inserted. Located within receiving portion 44 may be a nozzle lever 45. A nozzle lever 45 may be operatively connected to trigger 42. This connection may be such that a user may manually apply a force to trigger 42, thus displacing trigger 42, and this displacement results in nozzle lever 45 also being displaced.

Figure 12:
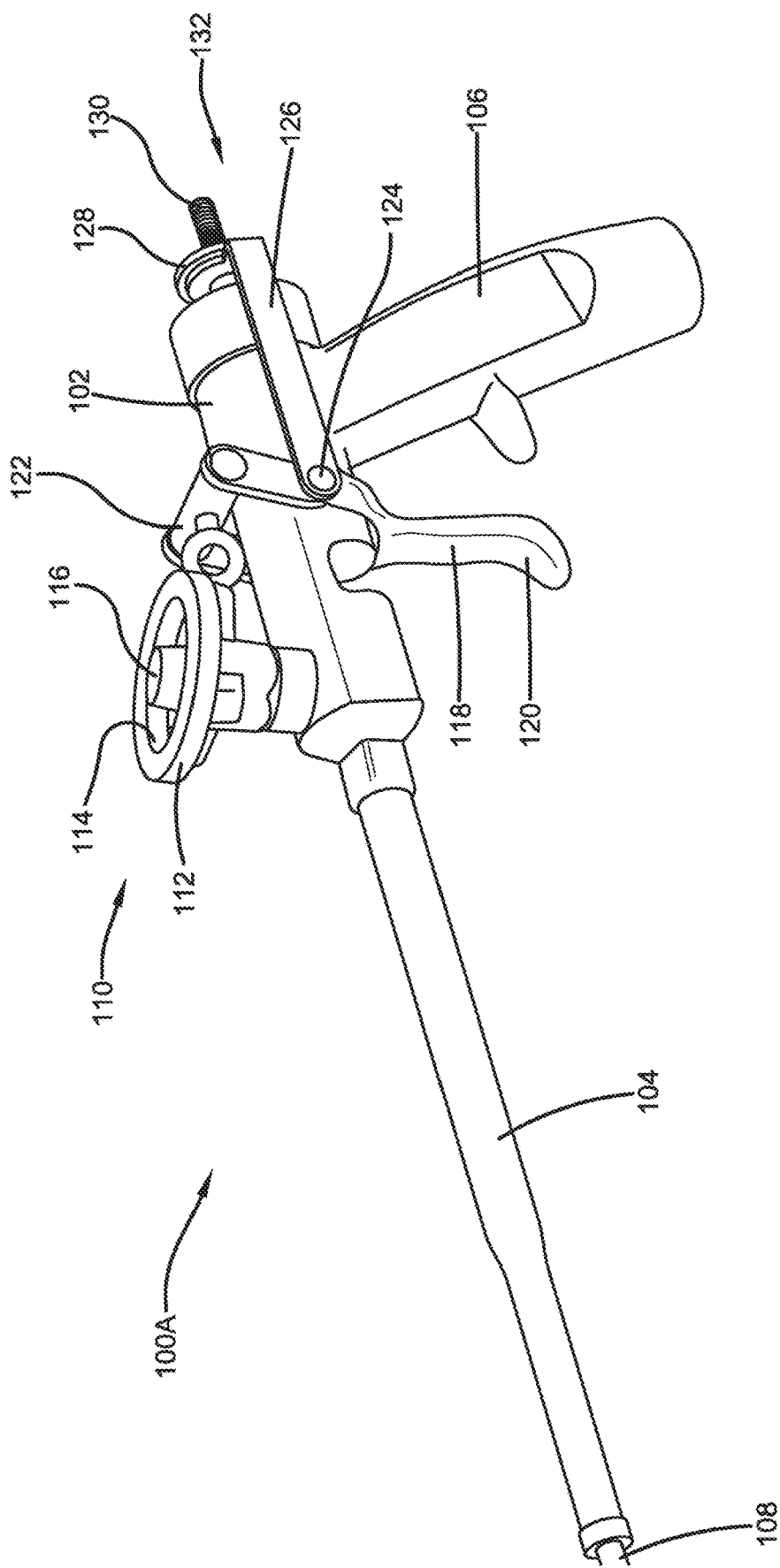
FIG. 12 is a side perspective view of a spray apparatus according to some embodiments of this invention.

With reference now to FIGS. 1, 2, 12 and 13, spray apparatuses 100A, 100B are shown. Because many of the components are similar, many of the same reference numbers will be used in both. Each spray apparatus 100A, 100B may include a housing 102, a barrel 104 supported to the housing 102 and a handle 106 also supported to the housing 102. For the embodiments shown, the spray apparatuses 100A, 100B may have a pistol-shape but other shapes may work well also. The barrel 104 may be hollow and may extend distally (away from the handle) to a tip 108. The hollow barrel 104 and tip 108 may define a fluid passageway bore. In one embodiment, the tip 108 is the distal end of the apparatus 100A, 100B and the point from which paint fluid is dispensed. In another embodiment, the tip 108 comprises a fitting to which another component (not shown) may be attached and from which the paint fluid is dispensed. The barrel 104 may decrease in outside diameter, as shown in FIG. 12, in the distal direction.

Figure 13:
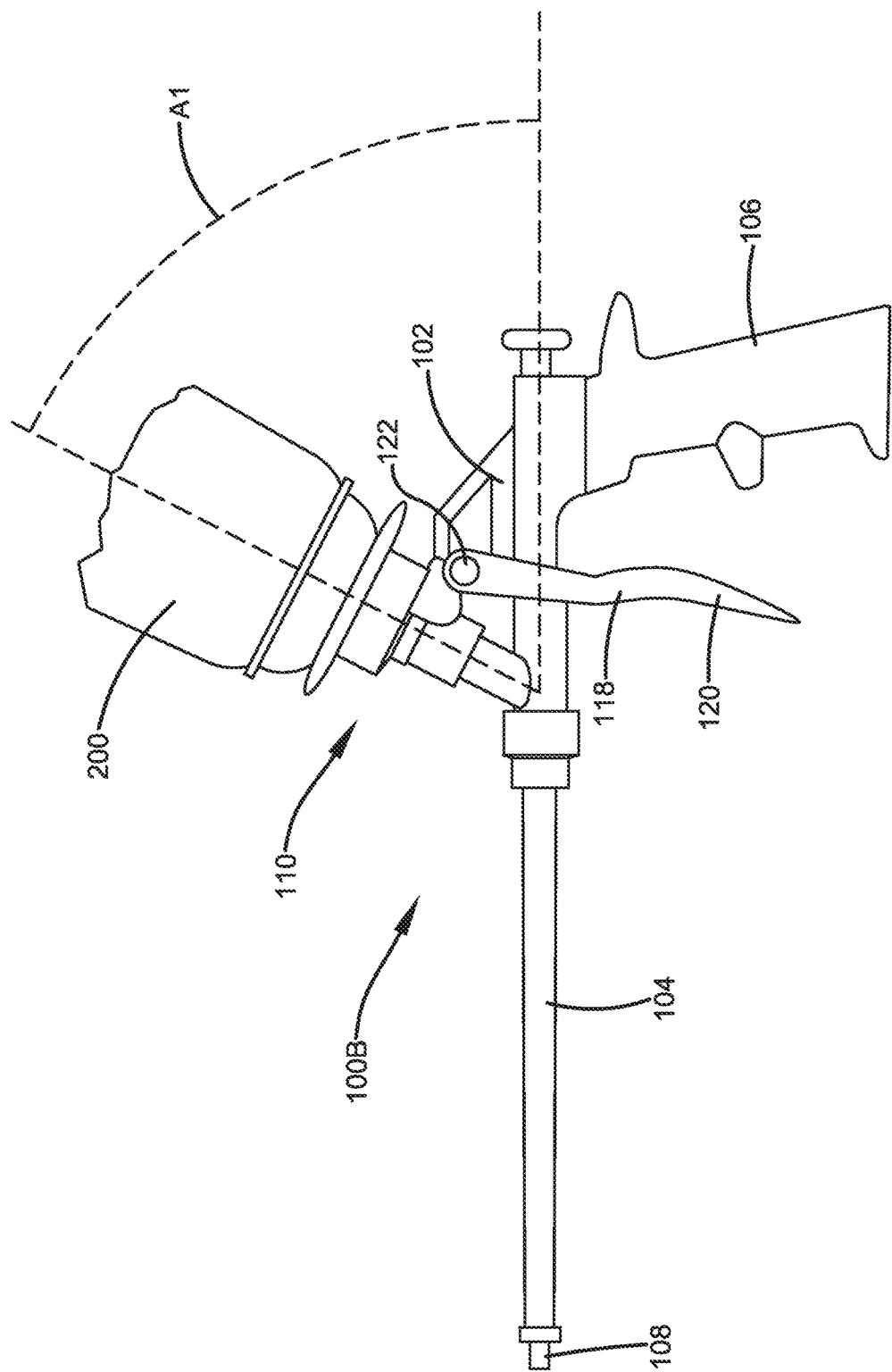
FIG. 13 is a side view of a spray apparatus with a can, only a portion shown, attached to the can receiving portion.

With continued reference to FIGS. 12 and 13, a container receiving portion 110 may be supported to the housing 102 and sized and shaped to securely retain/support a paint container 10 or 200. For the embodiment seen best in FIG. 12, the container receiving portion 110 may include an outer, generally circular ring 112 defining an opening 114, and a nozzle reception connector 116. The user may attach the pressurized container 10, 200 to the apparatus 100A, 100B, as shown in FIG. 13, such that the nozzle 31, 202 is received within the nozzle reception connector 116 and the valve body 30 or top of can 200 is received within the opening 114. The nozzle reception connector 116 communicates with the fluid passageway in the barrel 104 so that the fluid paint within the pressurized container 10, 200 can be dispensed out the tip 108, when desired. For the embodiments shown, the container receiving portion 110 is positioned on a top portion of the apparatus 100A, 100B. As a result, gravity assists in assuring that all the liquid within the container is used. The receiving portion 110 may extend from the apparatus at an angle A1, as shown in FIG. 13, with respect to the longitudinal axis of the housing 102 and/or barrel 104. Angle A1 may be, in one embodiment, between 0 degrees and 90 degrees. In another embodiment, angle A1 may be between 10 degrees and 80 degrees. In yet another embodiment, angle A1 may be between 20 degrees and 70 degrees. For the embodiment shown, angle A1 is approximately 75 degrees.

Still referring to FIGS. 12 and 13, the spray apparatus 100A, 100B may also include a trigger 118 which is moveable relative to the housing 102 in order to deflect the nozzle 31, 202 to dispense the paint fluid. The trigger 118 may have a first end with a user contact surface 120 and a second end with a discharge contact surface 122. When the trigger 118 is manually operated, in one embodiment moved, by the user, such as by squeezing the user contact surface 120 toward the handle 106 with the user's hand, the discharge contact surface 122 contacts the nozzle 31, 202 to deflect it and dispense the fluid. The trigger 118 may be moveably attached to the housing 102 in any manner chosen with the sound judgment of a person of skill in the art.

For the embodiment shown in FIG. 12, the second end of the trigger 118 has a U-shaped portion with legs that extend juxtaposed to opposite sides of the housing 102 and pivots about pivot pin 124 which is received through the legs and through the housing 102. In an alternate embodiment, one pivot pin connects one leg to the housing on one side and a second pivot pin connects the other leg to the housing on the opposite side. To provide container size adjustability, an adjustment mechanism 132 may be used. The adjustment mechanism 132 may include bracket 126 that extends from the trigger 118 to a nut 128 that is threadingly received on a threaded rod 130 that is supported to and extending from the housing 102. For the embodiment shown in FIG. 12, the bracket 126 has an opening that receives the pivot pin 124. In an alternate embodiment, another bracket (not visible) extends from the nut 128 to the trigger 118 on the other side of the apparatus 100A. To adjust the apparatus 100A to fit different sized containers, the nut 128 can be rotated about rod 130 to move the bracket 126 and thus the trigger 118 along the longitudinal axis of the housing 102 (that is, along the longitudinal axis of the barrel 104) either closer to the receiving portion 110 or farther away.

With reference again to FIGS. 12 and 13, to use the spray apparatuses 100A, 100B, the user attaches the container 200 or container 10 equipped with the adaptor 20 and valve body 30, to the container receiving portion 110, as explained above. If necessary, the user adjusts the adjustment mechanism 132 to fit the container. The user then only has to position the tip 108 (or other component that is attached to the tip) to the desired location and then move the trigger 118 with respect to the handle 106 (such as by squeezing the trigger 118 toward the handle 106). The trigger 118 movement deflects the nozzle 31, 202 dispensing the fluid out of the container and out of the tip 108.

Figure 16:
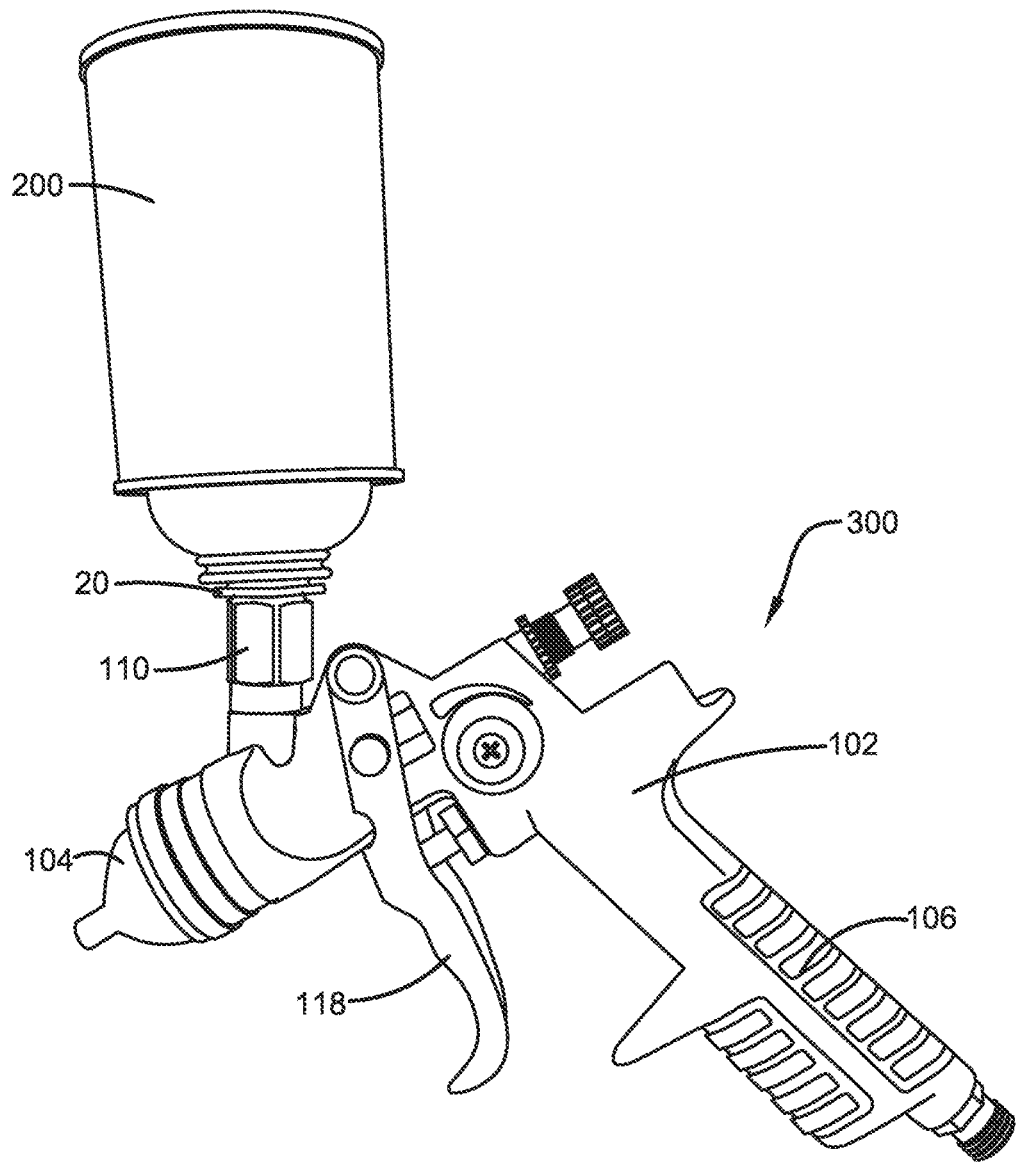
FIG. 16 is a side view of a spray apparatus according to other embodiments of this invention.
Figure 17:
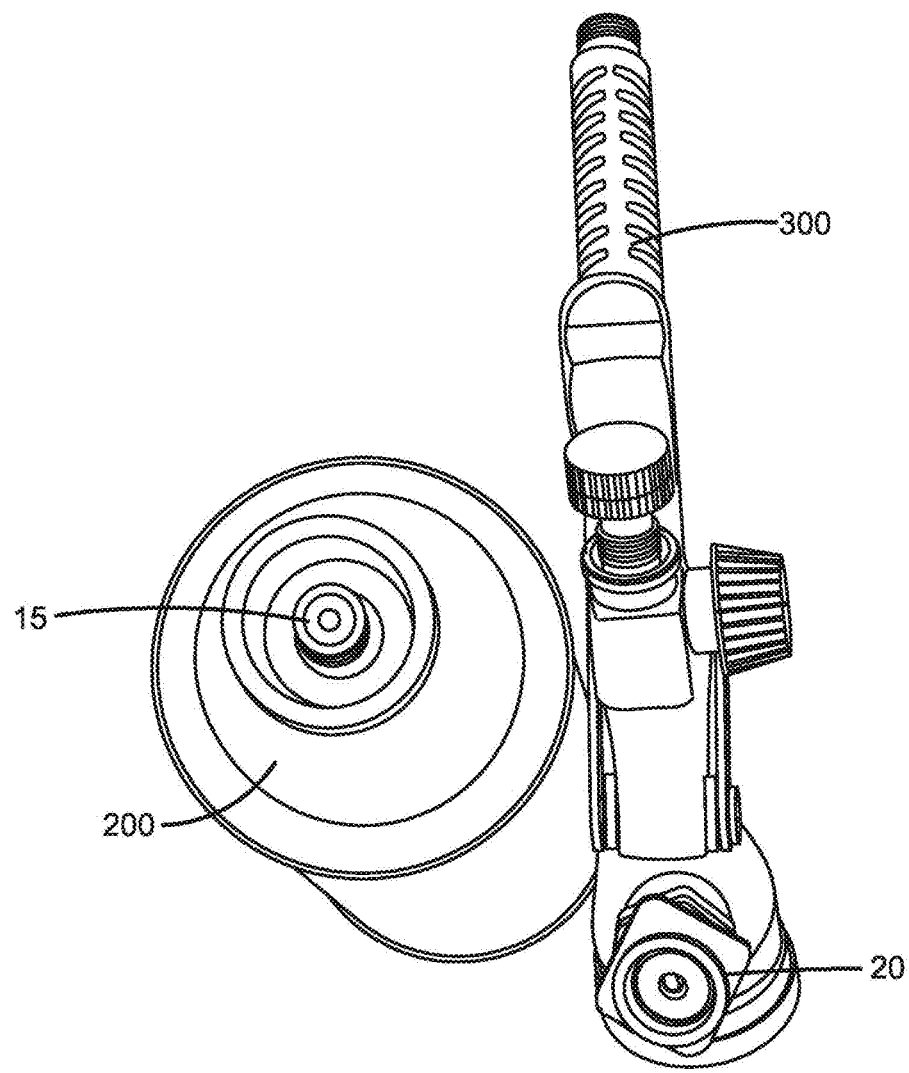
FIG. 17 is a top view of the spray apparatus shown in FIG. 16 but with the paint container detached.
Figure 18:
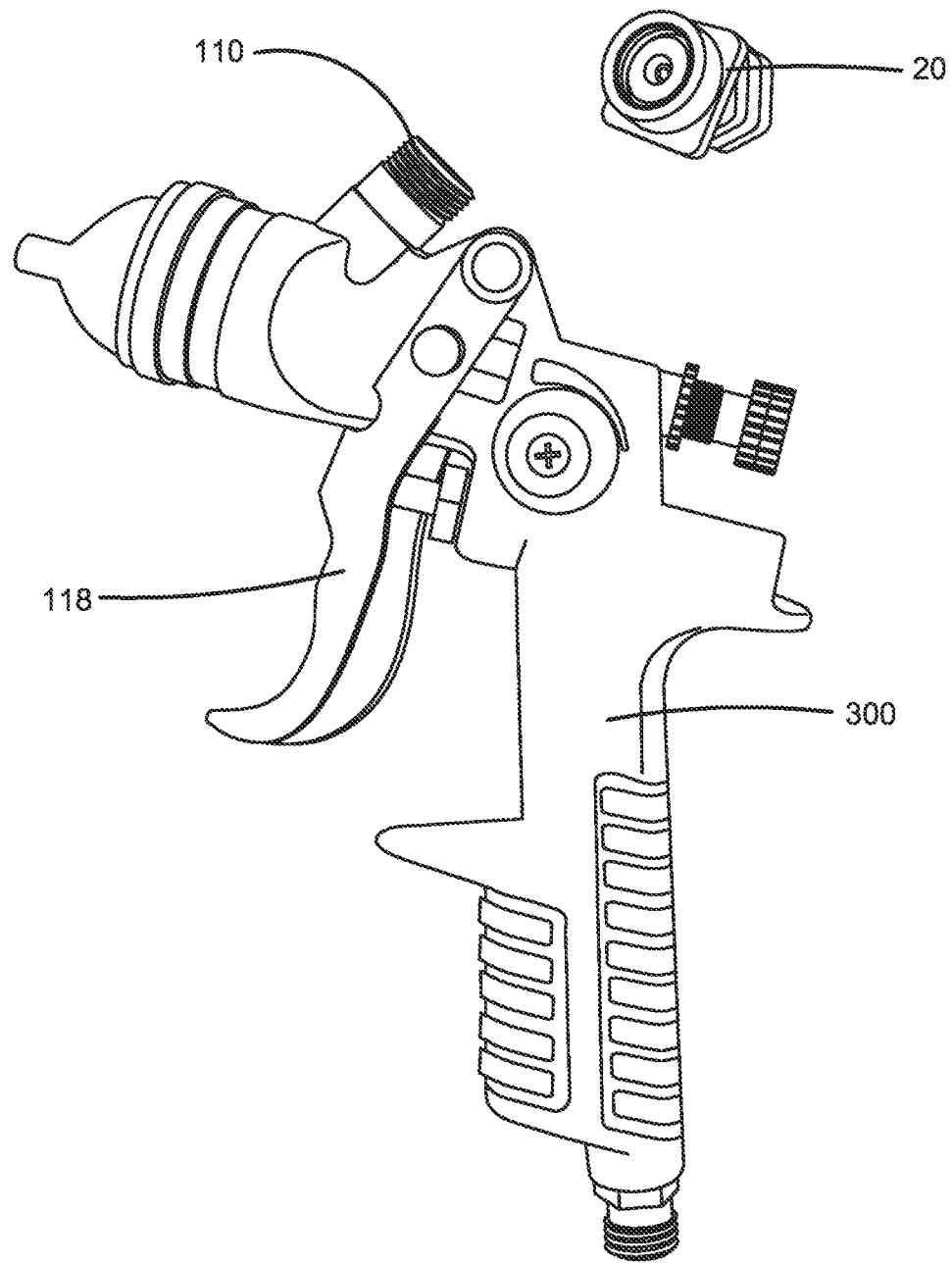
FIG. 18 is a side view of the spray apparatus shown in FIG. 16 but with the adaptor detached and the paint container not shown.

With reference now to FIGS. 16-18, another spray apparatus 300 incorporating embodiments of this invention is shown. As with spray apparatuses 100A, 100B described above, spray apparatus 300 may include a housing 102, a barrel 104 supported to the housing 102, a handle 106 supported to the housing 102, and a trigger 118. FIG. 16 shows the paint container 200 attached to the spray apparatus 300 and FIGS. 17 and 18 show the paint container 200 removed from the spray apparatus 300. FIG. 17 shows the container's pieced membrane 15. Visible in each of these drawings is adaptor 20. In FIG. 16 the adaptor 20 is positioned between the paint container 200 and the container receiving portion 110 of the spray apparatus 300. This is the "use" condition as operating the trigger 188 will permit the paint fluid to exit paint container 20 under a pressure above ambient, flow through adaptor 20, through container receiving portion 110 and to barrel 104. In FIG. 17 the paint container 200 has been removed and the membrane 15 has been pierced. This is the "after use" condition and it is very easy for the user to now dispose of the paint container 200 as all pressure above ambient has been removed. In FIG. 17 the adaptor 20 remains connected to the spray apparatus 300 and could be reused with another pressurized paint container (not shown) if desired. In FIG. 18 the adaptor 20 has been removed from the container receiving portion 110 and thus removed from the spray apparatus 300. The operation of the spray apparatus 300 is similar to the spray apparatuses described above so further details will not be provided here.

With reference now to FIGS. 1 and 3, methods of using the fluid dispensing apparatus 50 will now be described. The paint container 10 may be equipped with container cap 11 by the manufacturer, in one embodiment. The fluid dispensing apparatus 50 may come to the user as a kit, in one embodiment, including the adaptor 20 and the valve body 30. In one embodiment, the adaptor 20 may already be attached to the valve body 30. In another embodiment, the coupling element 22 (see FIG. 4A) is attached to coupling element 33 (see FIG. 10) to attach the adaptor 20 to the valve body 30. In one specific embodiment, this may comprise rotating the adaptor 20 with respect to the valve body 30 with threaded section 59 engaged with threaded section 37 to "tighten" them together. This action may compress seal 24 and a lower service of the valve body 30 may contact surface 51, or come near to contacting it. In another embodiment, the fluid dispensing apparatus 50 may come to the user already attached to the pressurized container 10.

With reference now to FIGS. 1, 3, 4B, 6 and 10, the user then attaches the fluid dispensing apparatus 50 to the paint container 10. In one embodiment, this means attaching the coupling element 21 of the adaptor 20 (see FIG. 4B) with the coupling element 12 of container 10 (see FIG. 3). In one specific embodiment, this may comprise rotating the fluid dispensing apparatus 50 with respect to the paint container 10 with threaded section 57 engaged with threaded section 19 to "tighten" them together. This action may compress seal 23. As the fluid dispensing apparatus 50 is attached to the paint container 10, piercing member 27 (see FIG. 4B) contacts and pierces membrane 15 (see FIG. 3 to see the membrane 15 before it is pierced, and FIG. 6 to see the membrane 15 after it is pierced). Once the membrane 15 is pierced, container bore 14 communicates with adaptor bore 26 which communicates with valve body bore 34. Thus, once the fluid dispensing apparatus 50 is attached to the pressurized container 10, all the user needs to do to dispense the paint is operate nozzle 31, such as by deflecting the nozzle 31, as described above. Thus, operation of the fluid dispensing apparatus 50 with container 10 as shown in FIG. 1 is similar to the use of container 200 and nozzle 202 shown in FIG. 2.

With reference now to FIGS. 7-9, in another embodiment, dispensing wand 40 may be used to dispense paint fluid from paint container 10 using the following method. After the fluid dispensing apparatus 50 is attached to the paint container 10, the user may align the longitudinal axes of wand 40 with the dispensing apparatus 50. Next the user may insert container 10 and dispensing apparatus 50 into receiving portion 44, such as within opening 47, with nozzle 31 in proximity to nozzle lever 45. The user may then hold the wand 40 upright by grip 41 and place wheel 43 on desired surface to be traversed. Next the user may pull trigger 42 using his/her finger thus displacing trigger 42. This displacement may result in nozzle lever 45 also being displaced. The displacement of nozzle lever 45 may then result in nozzle 31 being deflected and the contents of container 10 being dispensed. The user may then wheel wand 40 (that is, move the wand 40 using the wheel 43) and fluid dispensing apparatus 50 with container along a desired path thus easily dispensing paint fluid along the path.

In another embodiment, paint container 10 may be depressurized and substantially emptied of paint fluid according to the following method. The user may uncouple or detach container 10 from adaptor 20 (and thus from fluid dispensing apparatus 50) and separate the two components. With container 10 separated from adaptor 20, pierced membrane 15 is exposed to the ambient thus resulting in container 10 becoming depressurized. Next, container 10 may be substantially emptied of fluid by placing it with pierced membrane 15 facing down and thus using gravity to force the paint fluid out of container 10. At this point paint container 10 may be easily deposed of. The fluid dispensing apparatus 50 may then be reused with another paint container.

Methods of using the apparatuses shown in FIGS. 12 and 13 have been discussed above. It will be noted again, however, that the apparatuses of FIGS. 12 and 13 can be used either with a known paint container such as paint container 200 shown in FIG. 2 or with a fluid dispensing apparatus 50 and paint container 10 according to various embodiments of this invention described above.

Since conventional spray cans include an internal valve, producing such spray cans has typically involved filling the spray cans through the valve, which could then prevent those contents from escaping once filling was complete. However, since the paint container of the present disclosure lacks an internal valve, the present paint container must be filled and the container cap installed to seal the interior space of the paint container without installing a valve.

Figure 22:
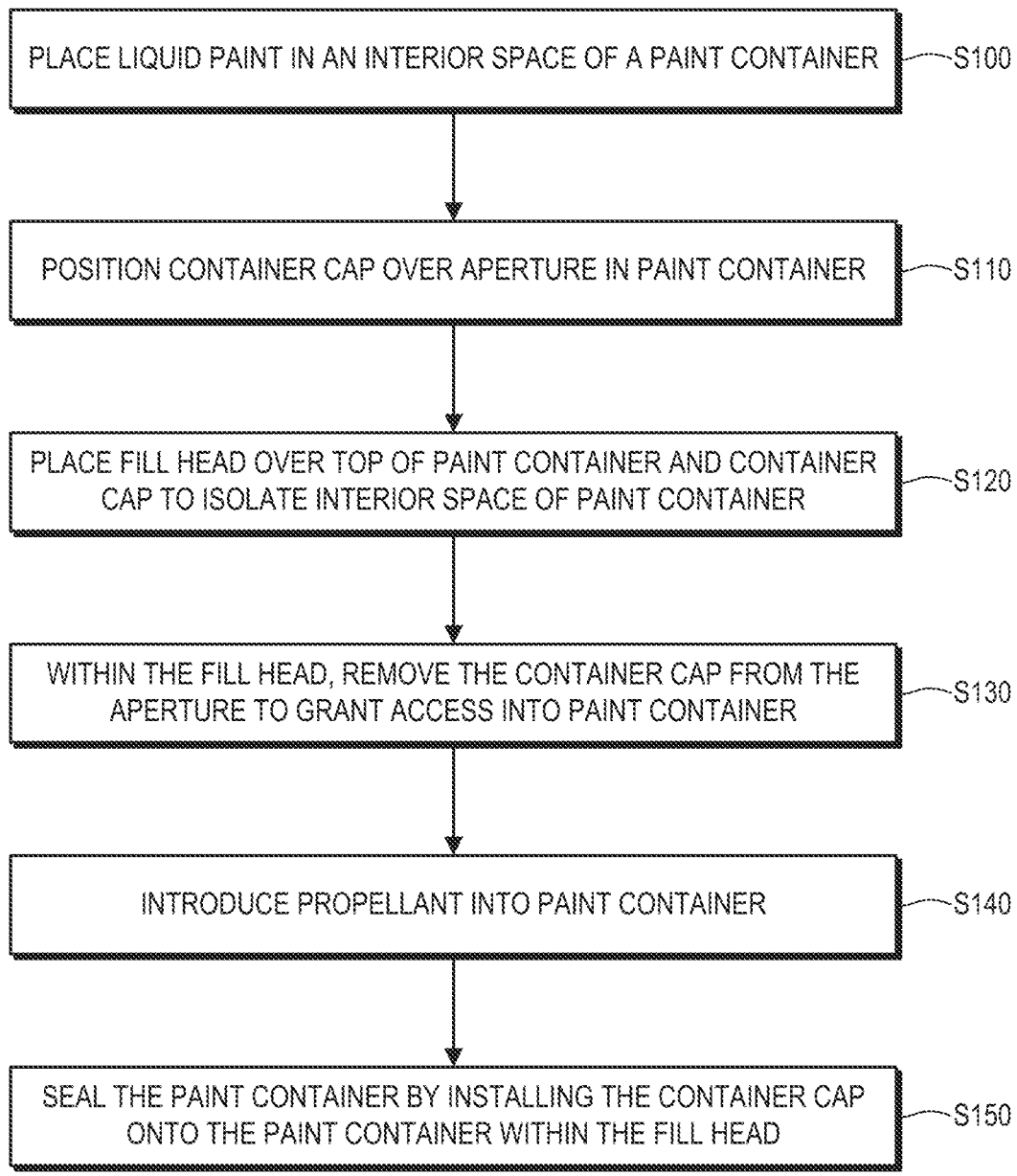
FIG. 22 is a flow diagram schematically representing a method of producing a paint container in accordance with an embodiment of the present disclosure.
Figure 23:
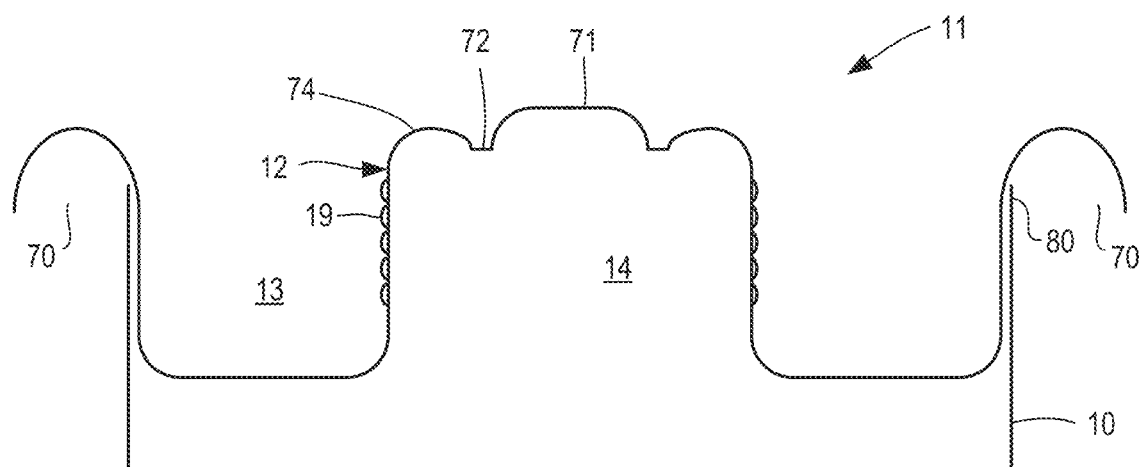
FIG. 23 is a cutaway view of the embodiment of the container cap shown in FIGS. 19 and 20, placed over a rim of a paint container before the container cap is secured to the paint container to enclose the interior space of the paint container storing paint and a propellant.

A method of producing a paint container is schematically depicted in FIG. 22. At step S100, liquid paint is added to the interior space defined by a housing of the paint container 10 through an aperture defined by a rim 80 (FIG. 23) of the paint container 10. Although FIG. 23 shows the container cap 11 in place over the rim 80, the paint can optionally be added to the paint container under atmospheric pressure before the container cap 11 is positioned adjacent to the aperture defined by the rim 80 at step S110, and optionally before the paint container 10 is covered by an enclosure for introduction of the propellant as described below. Positioning the container cap 11 at step S110 can optionally include using a mechanical arm or other grasping device to mechanically grasp a handling member 60 projecting from the container cap 11 and, under the control of a programmed computer processor, nearly concentrically aligning the longitudinal axis of the holding member 60 with the aperture defined by the rim 80. With the handling member 60 aligned with the aperture defined by the rim 80, the container cap 11 with the handling member 60 can be lowered into place such that the channel 70 receives the rim 80. Since the handling member 60 does not fully block the bore 14 and prevent paint and propellant from passing through the bore 14, the handling member 60 can remain within the paint container 10 even though it has already served its purpose to align the container cap 11 over the aperture defined by the rim 80. Even if the friction fit between the container cap 11 and the handling member 60 allows the handling member 60 to separate from the container cap 11 within the sealed paint container 10, no degradation of the assembled system is expected.

A containment device such as a filler head is placed over the container cap 11 resting on, or positioned over the rim 80 aperture to form an enclosure in which a pressure above atmospheric pressure can be maintained during introduction of the propellant into the paint container 10. Since the propellant is volatile, and evaporates at atmospheric pressure, the filler head, containment device or other enclosure can be positioned over a portion of the paint container 10 comprising the aperture to abut against the paint container 10 or other structure to form the enclosure in which the elevated pressure can be maintained during introduction of the propellant. The container cap 11 can be separated from the rim 80 if resting thereon at step S130 and, with the enclosure in place over at least a portion of the paint container 10, a quantity of a propellant is introduced into the interior space of the paint container 10 through the aperture at step S140. The amount of the propellant introduced is suitable to establish a pressure within the interior space to propel the paint from the paint container 10. As the fluid is introduced, the pressure within the enclosure rises above atmospheric pressure. While the enclosure is still in place, the container cap 11 is installed on the rim 80 of the paint container 10 within the enclosure, at step S150, after the propellant has been fully introduced to close the aperture and seal the paint container 10 to contain the combination comprising the liquid paint and the propellant. The paint container 10 can then be removed from the containment device after the container cap 11 has been installed to seal the aperture.

Embodiments of the present method allow for the insertion of a split, elastomeric gasket between the container cap 11 and the rim 80 to promote a strong seal. For such embodiments, the gasket can be disposed within the annular channel 70 in FIG. 23, for example, and compressed between the deformed rim 80 of the paint container 10 and a surface defining the annular channel 70. However, embodiments of the method that utilize the container cap 11 provided with the laminate coating 75 can optionally install the container cap 11 on the rim 80 without the use of a separate, elastomeric gasket that must be positioned independently of the container cap 11 and rim 80. According to such embodiments, the annular channel 70 extending about a periphery of the container cap 11 is placed on, and receives the rim 80 of the paint container in a first state, shown in FIG. 23. Without installing a valve within the interior space of the paint container 10, a collet or other suitable crimping tool can be used to deform the rim 80 of the paint container 10 within the annular channel 70 as shown in FIG. 24, in which the rim 80 is rolled onto itself within the annular channel 70, as an example of suitable deformation. The deformation of the rim 80 into a second state establishes a friction fit between the annular channel 70 of the container cap 11 and the paint container 10 suitable to interfere and prevent the escape of significant portions of the propellant between the container cap 11 and the paint container 10. The elasticity exhibited by the thin (e.g., less than 20 mils (0.020 in.), less than 15 mils, less than 10 mils, less than 8 mils, less than 6 mils, etc.) laminate coating 75 can establish a suitably-tight seal in the absence of a separately-positioned gasket between the container cap 11 and the rim 80.

The foregoing description of examples and embodiments have been presented for purposes of illustration and description. It is not intended to be exhaustive or limiting to the forms described. Numerous modifications are possible in light of the above teachings. Some of those modifications have been discussed, and others will be understood by those skilled in the art. The examples and embodiments were chosen and described in order to best illustrate principles of various examples as are suited to particular uses contemplated. The scope is, of course, not limited to the examples and embodiments set forth herein, but can be employed in any number of applications and equivalent devices by those of ordinary skill in the art. It will be apparent to those skilled in the art that the above methods and apparatuses may incorporate changes and modifications without departing from the general scope of this invention. It is intended to include all such modifications and alterations.

We claim:

1. A reusable fluid dispensing apparatus for controlling an expulsion of paint from a paint container, the paint container storing the paint to be discharged in an interior space that lacks an internal valve to control discharges of the paint, the paint container further comprising a pierceable membrane and a coupling element that cooperates with the reusable fluid dispensing apparatus to releasably couple the reusable fluid dispensing apparatus to the paint container, the fluid dispensing apparatus comprising:

- a valve body comprising: (i) a releasable fastener that engages a compatible connector provided to the paint container to couple the fluid dispensing apparatus to the paint container, and (ii) a support member that protrudes from the valve body and cooperates with a portion of a protective cap to be installed on the reusable fluid dispensing apparatus;
- a valve coupled to the valve body to be supported externally of the paint container while the reusable fluid dispensing device is installed on the paint container to control the expulsion of the paint from the paint container;
- a nozzle in fluid communication with the valve, the nozzle being manually adjustable to open the valve and direct paint expelled from the paint container that passes through the valve toward a target surface, wherein the support member couples the protective cap to the reusable fluid dispensing apparatus in a position to protect the nozzle against contact with a foreign object; and
- a piercing member that defines an interior passage and is positioned to puncture a membrane enclosing the paint container to establish fluid communication between the paint container and the valve.

2. The reusable fluid dispensing apparatus of claim 1, wherein the support member protrudes in a radially outward direction, from a domed region of the valve body.

3. The reusable fluid dispensing apparatus of claim 1, wherein the support member is integrally formed with the valve body as a monolithic structure.

4. The reusable fluid dispensing apparatus of claim 1, wherein the support member defines an aperture that is compatible to receive the portion of the protective cap.

5. The reusable fluid dispensing apparatus of claim 4, wherein the aperture is shaped to receive a rib that extends about an interior surface of the protective cap.

6. The reusable fluid dispensing apparatus of claim 1 further comprising a notification provided to a portion of the valve body.

7. The reusable fluid dispensing apparatus of claim 6, wherein the notification is indelibly formed as part of the valve body.

8. The reusable fluid dispensing apparatus of claim 6, wherein the notification is applied to a surface of the valve body.

9. The reusable fluid dispensing apparatus of claim 6, wherein the notification comprises text warning about a possible condition of using the reusable fluid dispensing apparatus.

10. The reusable fluid dispensing apparatus of claim 1, wherein the protective cap comprises a cylindrical shell defining a finger notch, and the support member couples the protective cap to the reusable fluid dispensing apparatus such that the cylindrical shell extends at least partially about the nozzle and the finger notch is adjacent to the nozzle, allowing manual manipulation of the nozzle through the finger notch.

* * * * *